United States Patent [19]

Kramer et al.

[11] Patent Number: 4,466,716
[45] Date of Patent: Aug. 21, 1984

[54] SLIDE PROJECTOR HAVING TWO IMAGE-PROJECTION SYSTEMS WHICH OPERATE WITH A SINGLE SLIDE TRAY

[75] Inventors: Milo G. Kramer, Mukilteo; Albert S. Ballard, Bothell; Gideon A. Kramer, Seattle, all of Wash.

[73] Assignee: Source Technologies Corporation, Mukilleo, Wash.

[21] Appl. No.: 286,519

[22] Filed: Jul. 24, 1981

[51] Int. Cl.³ .............................................. G03B 21/20
[52] U.S. Cl. ....................................... 353/94; 353/95; 353/111; 353/89; 353/117
[58] Field of Search ........................ 353/82, 83, 86, 89, 353/90, 95, 111, 115–117, 92–94, 25, 27 R, 27 A, 105–107

[56] References Cited

U.S. PATENT DOCUMENTS

| | | | |
|---|---|---|---|
| 3,194,115 | 7/1965 | Giwosky | 353/89 X |
| 3,276,314 | 10/1966 | Robinson | 353/111 X |
| 3,501,233 | 3/1970 | Winkler et al. | 353/111 X |
| 4,165,161 | 8/1979 | Kramer | 353/94 X |

Primary Examiner—Harry N. Haroian
Attorney, Agent, or Firm—Cole, Jensen & Puntigam

[57] ABSTRACT

The slide projector includes side-by-side image-projection systems and a circular slide tray, with slides passing in operation directly between the slide tray and either of two slide gates, the slide gates moving between a first position in which slides are acquired and released, and a second position in which slides are projected onto a screen. A slide lifter, a slide tray lock, slide clamps on each slide gate, and the slide gates are operated in a particular sequence relative to the movement of the slide tray to insure proper handling of the slides in the projector. The slide tray fits on a central hub which in turn is independently driven. Sensors are provided to continuously detect the position of the lifter, the slide gates, and the slide tray. A front end assembly which incorporates lenses which move laterally and vertically, with the longitudinal axes of the lenses remaining parallel at all times, provides precise image alignment, including image overlap and separation.

13 Claims, 23 Drawing Figures

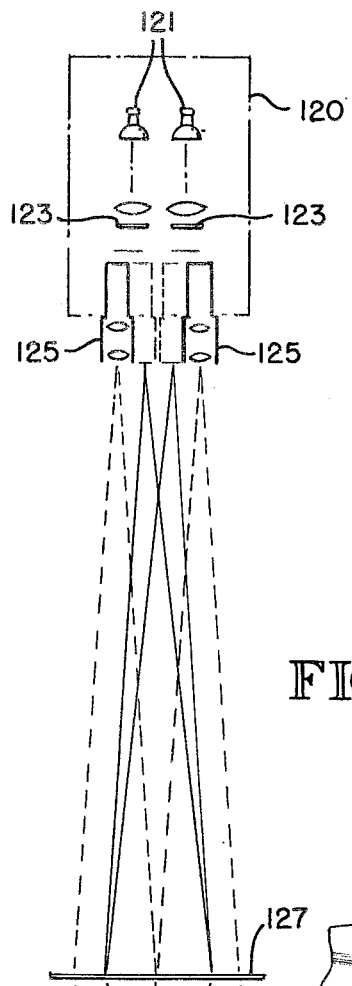
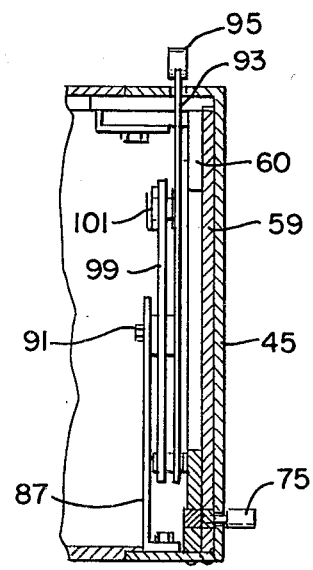
FIG. 7   FIG. 6
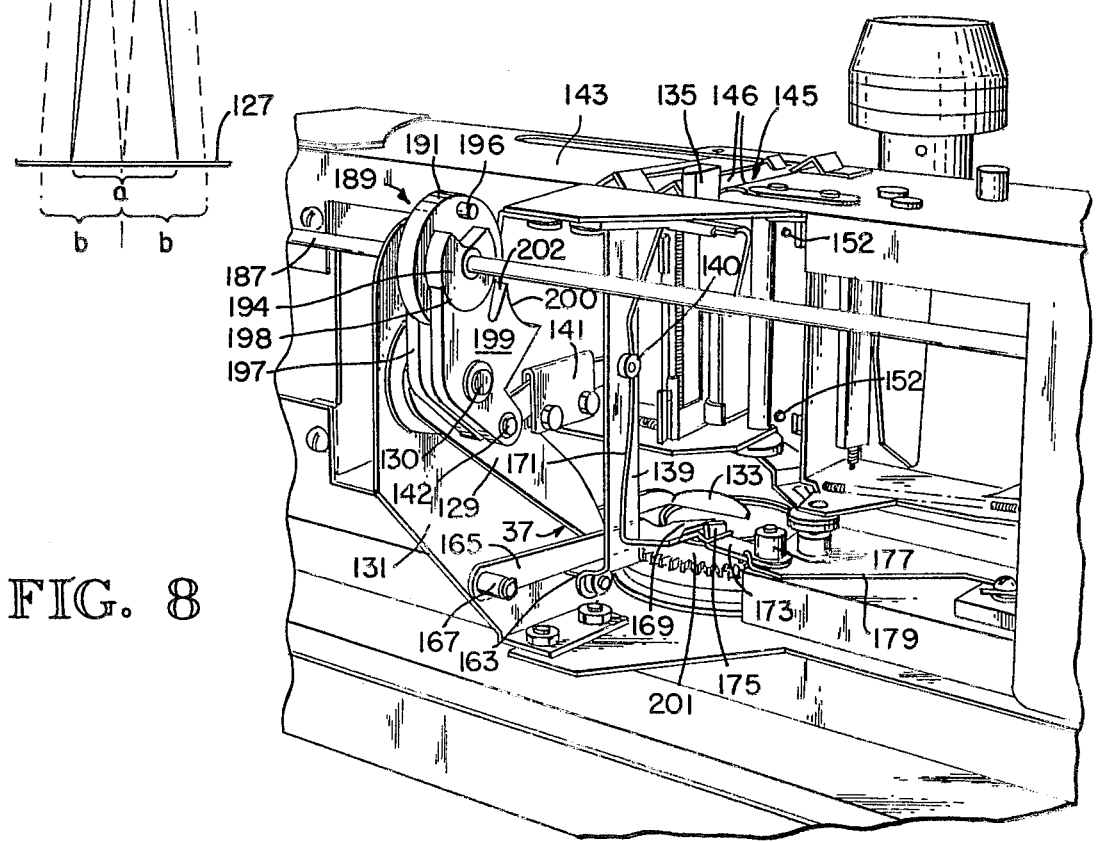
FIG. 8

FIG. 10

SLIDE PROJECTOR HAVING TWO IMAGE-PROJECTION SYSTEMS WHICH OPERATE WITH A SINGLE SLIDE TRAY

BACKGROUND OF THE INVENTION

This invention relates generally to the art of slide projectors and more specifically concerns a slide projector having multiple image projection systems.

The slide projector which is the subject of this application is an improvement to the projector disclosed and claimed in U.S. Pat. No. 4,165,161, issued on Aug. 21, 1979 to Gideon A. Kramer, titled: Multiple Optics Slide Projector. The subject matter of U.S. Pat. No. 4,165,161 is a two-image, lap-dissolve slide projector using a single circular slide tray. Although the projector disclosed therein was suitable for its intended purpose, improvements to its efficiency and operation were possible. The major areas of improvement in the present invention include (1) the slide handling system, (2) the drive and control system for the slide tray, and (3) the image alignment system.

Proper slide handling is important, because of the possibility of slide jams due to the sequence of slide movement in the projector, inherent in its design, which provides the dual image capability. Furthermore, an accurate, positive drive for the slide tray, as well as continuous, accurate knowledge of the position of the slide tray, relative to a reference point, is important to the proper operation of such a projector, especially because many of the individual elements are capable of independent actuation. Otherwise, it would not be possible to have a projector with a random access to the slide tray and other sophisticated capabilities.

In addition, proper image alignment is important. In conventional slide projectors, even existing dual image slide projectors, lateral movement of the images on the screen results in what is referred to as image keystoning, i.e. as the image is moved laterally, it tends to become shorter at one end relative to the other. The effect increases as the distance the image moves is increased, and can be quite noticeable. The keystoning effect thus has heretofore discouraged the use of more sophisticated image techniques, such as overlapping or separated simultaneous imaging, in audio-visual presentations using multiple images.

Accordingly, it is a general object of the present invention to provide a dual image, single tray slide projector which overcomes one or more of the disadvantages of the prior art discussed above.

It is an additional object of the present invention to provide such a slide projector which includes structural features designed to maintain positive control over the movement of slides in the projector and to minimize the possibility of a slide jam during operation of the projector.

It is another object of the present invention to provide such a projector which includes structural features designed to provide accurate and continuous knowledge of the position of the slide tray.

It is a further object of the present invention to provide such a projector which includes structural features designed to provide substantially undistorted images over a relatively wide lateral range of movement of the images.

It is yet another object of the present invention to provide such a projector which is capable of recognizing machine malfunction and/or incorrect human intervention and to stop operation of the projector, if necessary.

It is an additional object of the present invention to provide such a projector which has many elements capable of independent actuation and control.

SUMMARY OF THE INVENTION

Accordingly, the present invention concerns various aspects of a multiple image slide projector which includes a single slide tray, and first and second image projection systems, each of which include a projection lens and which in operation project slides received from the slide tray onto a screen. One aspect of the present invention is an image alignment system which includes means for moving either the projection lens or the slide in one or both of the image projection systems relative to the other, maintaining the direction of movement at right angles to the longitudinal axes of the image projection systems, which results in the image or images on the screen moving accordingly, substantially without keystoning distortion.

In another aspect of the present invention, concerning the detailed structure for moving the images, first and second lens plates are provided in a lateral movable relationship to each other. Means are provided for holding the two projection lenses, with each holding means being secured to an associated lens plate and thus movable therewith. Each lens plate includes two side-by-side openings therein, one opening being large enough to accommodate therethrough the projection lens of the holding means secured thereto, the other opening being large enough to accommodate therethrough the projection lens in the other holding means, including the range of movement of such lens as the two lens plates move laterally relative to each other.

A further aspect of the invention concerns a method of moving slides between the single slide tray and two slide gates, each of which move between a load position, in which slides are acquired and released, and a project position, in which slides are projected onto the screen. The method includes the steps of moving a slide gate from the project position into the load position, with the tray locked and the slide lifter in its lowered position, wherein the gate may or may not have a slide located therein, raising the slide lifter to the slide tray, unlocking the slide tray, moving the slide tray to address the tray location containing the next slide of interest, locking the slide tray, lowering the slide lifter, thereby permitting the slide to fall into the slide gate, and moving the slide gate from the load position into the project position.

A still further aspect of the present invention concerns an apparatus for controlling the movement of the tray. The slide tray is circular, with a central opening, which is mateable with a central hub. Means are provided for locking the slide tray to the central hub, and for driving the hub. The apparatus also includes means for sensing the rotational movement of the hub, and hence the slide tray, relative to a reference point.

Further, in another aspect of the present invention, first and second slide gate means for holding slides are provided, for use with a single slide tray, with each slide gate means being movable between a first position, common to both slide gate means, in which slides are acquired directly from, and released directly to, the slide receptacle, and a second position in which acquired slides are projected onto a screen or the like.

Means are included for moving the gates independently between the first and second positions.

In a still further aspect of the present invention an apparatus is provided for locking the circular slide tray to the central hub. A portion of the central hub, near the upper end thereof, is configured to mate generally with the central opening in the circular slide tray. A series of contact elements, which are expandable outwardly from the hub portion are provided, as are means which may be actuated by the operator to force the contact elements outwardly from the hub portion. The hub portion is configured relative to the central opening of the slide tray such that when the elements are forced outwardly, they come into frictional contact with the slide tray, in a nonslip relationship.

DESCRIPTION OF THE DRAWINGS

A more thorough understanding of the invention may be obtained by a study of the following detailed description taken in connection with the accompanying drawings in which:

FIG. 6 is a sectional view of the front end assembly of the projector of FIG. 1, taken along lines 6—6 of FIG. 3.

FIG. 7 is a simplified view showing the relative image relationships achievable on the screen by moving the projection lenses laterally relative to each other.

FIG. 8 is an oblique view of a portion of the projector of FIG. 1, showing most of the components of the slide handling system of the projector.

FIG. 10 is a top view of a substantial portion of the projector of FIG. 1, showing specifically the geneva plate for controlling the movement of the slide gates.

DESCRIPTION OF THE PREFERRED EMBODIMENT

Figure 1:
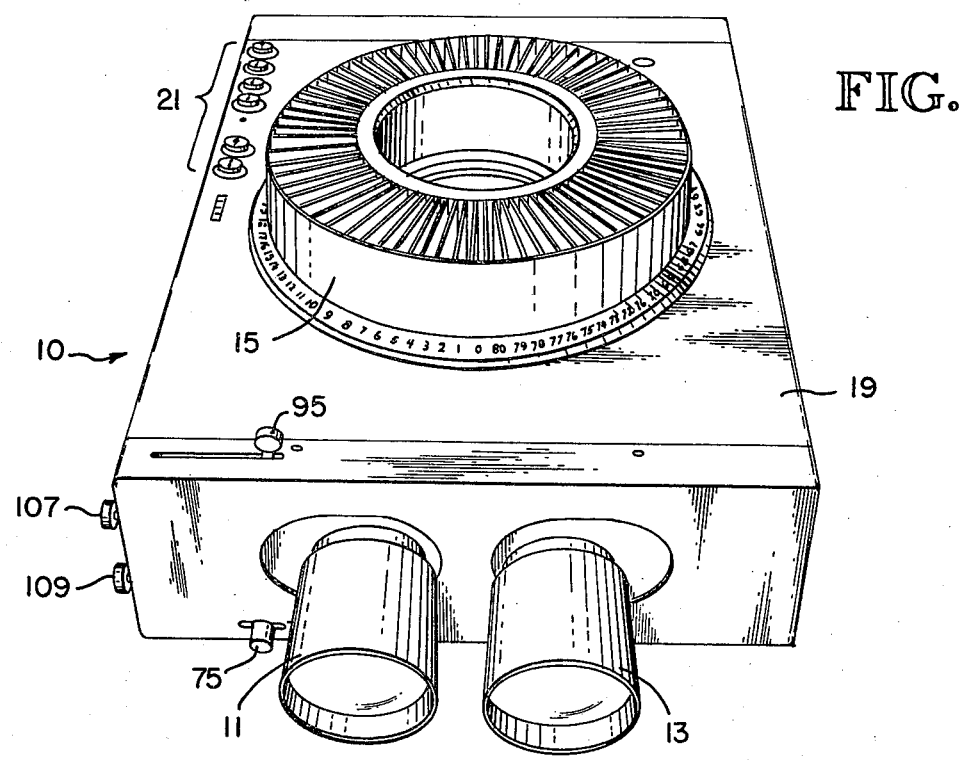
FIG. 1 is a perspective view of the exterior of the slide projector of the present invention.
Figure 2:
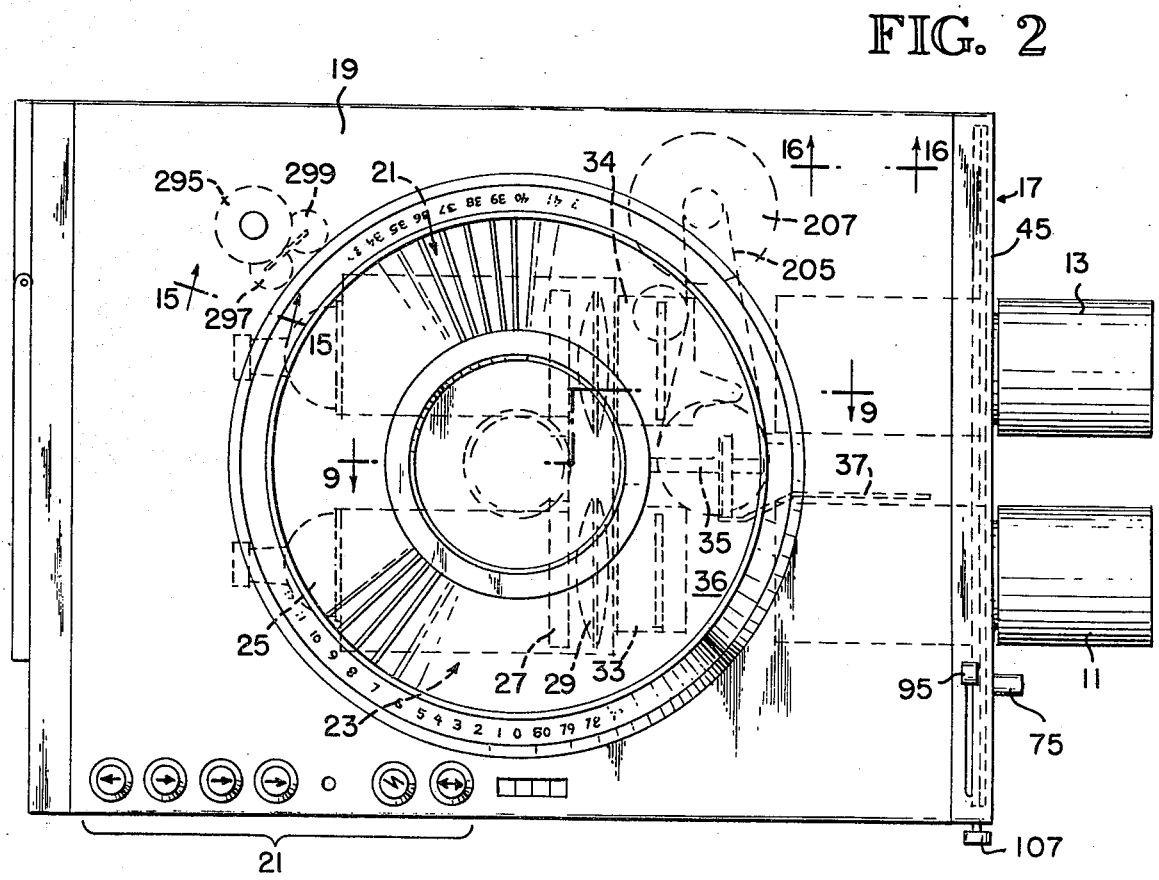
FIG. 2 is a simplified plan view of the projector of FIG. 1, showing the major components of the projector.

Referring now to FIGS. 1 and 2, the general structure of the slide projector of the present invention is shown. FIG. 1 is an exterior view of the projector, referred to generally at 10, showing the side-by-side projection lenses 11 and 13 and a circular slide tray 15. The projector 10 is enclosed by a case 19. The controls for the projector are located along one side of the top of the case 19, toward the rear of the projector, and are referred to as a group at 21.

FIG. 2 shows most of the basic operating elements of the projector, and their relative relationship, but does not show in detail some of the peripheral elements of the projector, such as the various drive systems, the sensing elements, and the blackout flaps. These elements are shown in detail in other figures and described hereinafter.

Referring specifically to FIG. 2, the projector 17 includes two image projection systems. Each image projection system, such as projection system 23, includes a light source 25, a heat filter 27, a condenser lens 29, and a projection lens. The projector includes two rotating slide gates, 33 and 34, one for each image projection system. Each slide gate rotates about respective upper and lower pivot points between a first, slide load position, directly beneath a slide opening 35 in a removable plate 36 in the top surface of case 19, opening 35 being in registry with a similar opening in the lower pan of slide tray 15, and a second, slide project position.

A slide lifter 37, located between the two lenses 11 and 13, contacts the bottom edge of the slides when they are in a slide gate and the slide gate is in its slide load position, and lifts them up into the slide tray from the slide gates. The lifter also holds the slides in the slide tray, clear of its retaining pan, so that during tray rotation, the slides are ramped over the open slot 35 in plate 36. The slide lifter is rotatable in a vertical plane about one end thereof, so that the free end of the lifter, which contacts the slides, moves between a first, lowered position, beneath the slide gate, and a second, raised position, adjacent the slide tray retaining pan.

The slide tray 15 is circular, such as the Carousel slide tray manufactured by Eastman Kodak Co., and is locked to a vertical central hub 39, which is driven by a DC motor/tachometer 41 through a large diameter drive disc (not shown) which is fixed to the central hub 39 near the bottom thereof, and extends outwardly therefrom, having approximately the diameter of the slide tray 15.

The front end assembly, which includes means for moving the two projection lenses 11 and 13 toward and away from each other laterally, is referred to generally at 17. The lenses are also capable of movement vertically relative to one another. The lenses 11 and 13, which each include an actual projection lens and a lens body, extend through the front plate 45 of the front end assembly. Openings are provided in the front plate 45 of sufficient size to accommodate the lateral and vertical movement of the lenses 11 and 13.

In operation of the projector, slides move from slide tray 15 into one or the other of slide gates 33, 34 through the openings in the retaining pan of the slide tray and the removable plate 36 in the top surface of case 19. The first, slide load position for each slide gate is a common position, so only one slide gate can be in the first position at a given time. After receiving a slide, the slide gate is rotated into its second, slide project position, and the image projection system associated with that lens is activated so that the slide image appears on the screen. While the slide in one image projection system is being shown, another slide may be loaded from the slide tray into the other slide gate and the slide gate moved into its project position, so that the slide is ready to be projected.

When the other slide gate is in its project position with a slide loaded therein, the image being shown on the screen is replaced, typically by a lap-dissolve technique, with the image of the slide in the other slide gate. When the slide in the other slide gate is being shown, the slide present in the one slide gate may be removed and replaced with another slide, and the image of the new slide may then be lap-dissolved with the image on the screen. This process of slide loading/unloading and slide gate movement, may continue in any desired sequence, with respect to the particular slide gate being used, and with a random access to any particular compartment in the slide tray, until the desired slide program is complete.

The above major projector elements, i.e. the slide tray, the slide gates, and the slide lifter are independently actuatable, providing great versatility in access to the slide tray and in sequencing the operation of the slide gates. The elements are independently controlled through a control module (not shown) which sequences the various elements in response to basic commands provided by the operator through controls 21. The above elements, with their drive systems, and several position sensing elements, are furthermore so individually structured to insure accurate, precise movement of the slide tray and the slides themselves, so as to minimize slide jams and the like.

FIGS. 3 through 6, 19 and 20 show the structural details of the front end assembly 17 of the projector. The two lenses 11 and 13 are each supported by a lens box. For lens assembly 11, for example, lens box 51 is substantially rectangular and substantially closed, except for circular openings 53 and 54 through the front and rear faces 56 and 58 of the lens box. The edges of openings 53 and 54 mate with the outer surface of lens 11 when the lens 11 is fully inserted into lens box 51.

Each lens box includes four lens guides which are narrow pads, typically made from nylon, which extend between the front and rear faces of the lens box adjacent the edges of the openings therein. Lens box 51 includes lower guides 55 and 57, which are located along lines which are approximately 45° removed, respectively, to opposite sides from the bottom center of the openings 53 and 54. A similar pair of top guides 52 and 62 are spring loaded so that they tend to press the lenses toward the lower guides. Lens guides 55,57, 52 and 62 provide the internal support in the lens box 51 for the lens 11.

The front surface of the two lens boxes lie flush against, and are attached to, respectively, lens plates 59 and 60. Lens plates 59 and 60 are parallel with each other, separated by intermediate bushings (not shown) which help to maintain their spacing and assist in permitting movement of the lens plates relative to each other in a manner described hereinafter. The lens plates 59 and 60 are positioned relatively close to the front plate 45. Each lens plate is slightly less in height than front plate 45, but not as wide, so that each lens plate can move several inches from side to side, and vertically a small distance as well.

Each lens plate 59 and 60 has two large openings therethrough, shown as 63 and 65 in cover plate 59 (FIG. 5), for example. The openings 63 and 65 are side-by-side. One opening 63 is substantially the size and configuration of the openings 53 and 54 in the lens box, i.e. just large enough to accommodate a projection lens. The lens boxes are secured to their respective lens plates such that the openings therein are in registry with the said one opening in the lens plate which is the same size.

For lens box 51, for example, the openings 53 and 54 therein mate with opening 63 in lens plate 59. The other opening in each lens plate, i.e. opening 65 in lens plate 59 is about the same height as opening 63, but about twice as wide, with the side edges of the opening being rounded and the top and bottom edges connecting the two side edges being straight. The total width of opening 65 is sufficient to accommodate the side-to-side range of movement of lens 13 in the other lens box, when the lens boxes with their associated lens plates move laterally relative to one another in operation of the projector. The front plate 45 also has two openings which are configured similar to opening 65, to accommodate the necessary lateral and vertical range of movement of each lens.

Each of the cover plates 59 and 60 slide back and forth laterally on hard plastic slides in the form of channels 67 and 68 (only a portion of channel 67 is shown). Both channel slides are supported by ramps. The rear ramps 67a, 67b are factory adjustable to change the height and side-to-side angle of lens plate 60, but are not adjustable by the user. Ramp 68a for the front lens plate 59 is likewise not adjustable by the user, but ramp 68b is, by releasing a screw 75 at the front of the front end assembly 17. The use of the ramps, both at the factory and by the user, insures proper vertical and angular tracking of the images on the screen, as may be necessary in the case of angular discrepancies in the slide gates or other parts of the optical system. To insure proper movement of the lens plates on the slides, at least the front lens plate is biased against its slide by a pair of flat springs, positioned in notches at the top of the plate near the opposite edges. Spring 74 is shown clearly in FIGS. 19 and 20.

The focusing of each lens 11, 13 is accomplished by moving the lens longitudinally with respect to the screen. This is accomplished in the embodiment shown via a motor 81 which when activated turns a pinion gear 83, through a motor shaft/worm gear arrangement. The pinion gear 83 is located directly beneath the lens, and spring loaded into mesh with a rack gear on the bottom of the lens. As the shaft of the motor 81 turns in one direction, the pinion gear 83 rotates in a first direction and the lens moves towards the screen, while the lens moves away from the screen when the motor shaft turns in the opposite direction. Although the embodiment shown includes a powered focusing system, which is initiated by the operator, it should be understood that techniques for automatically focusing the lenses, or alternatively, a completely manual focus, could be conveniently included or substituted for the one shown.

Figure 3:
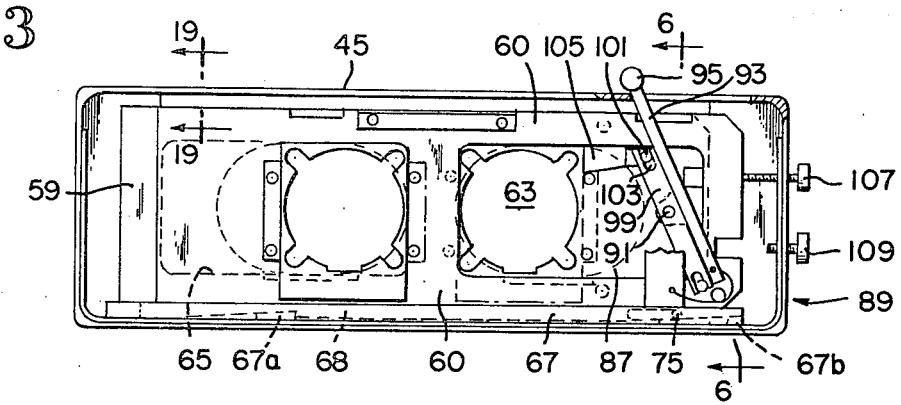
FIG. 3 is a sectional view of the front end assembly of the projector of FIG. 1, taken along lines 3—3 in FIG. 2, showing the projection lenses at the near extreme of their relative movement.
Figure 4:
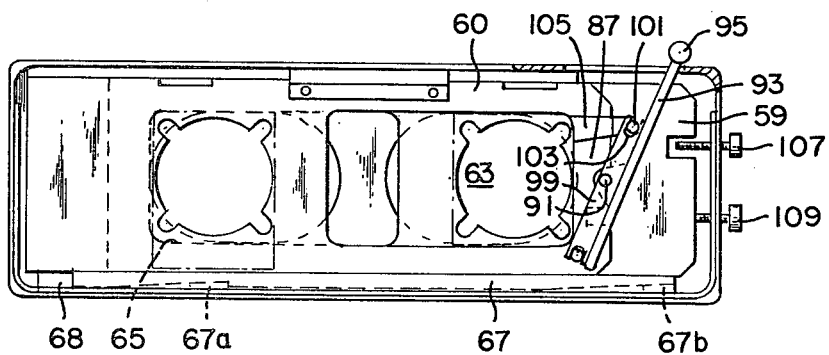
FIG. 4 is a sectional view of the front end assembly of the projector of FIG. 1 taken along lines 4—4 in FIG. 2, showing the projection lenses at the far extreme of their relative movement.
Figure 5:
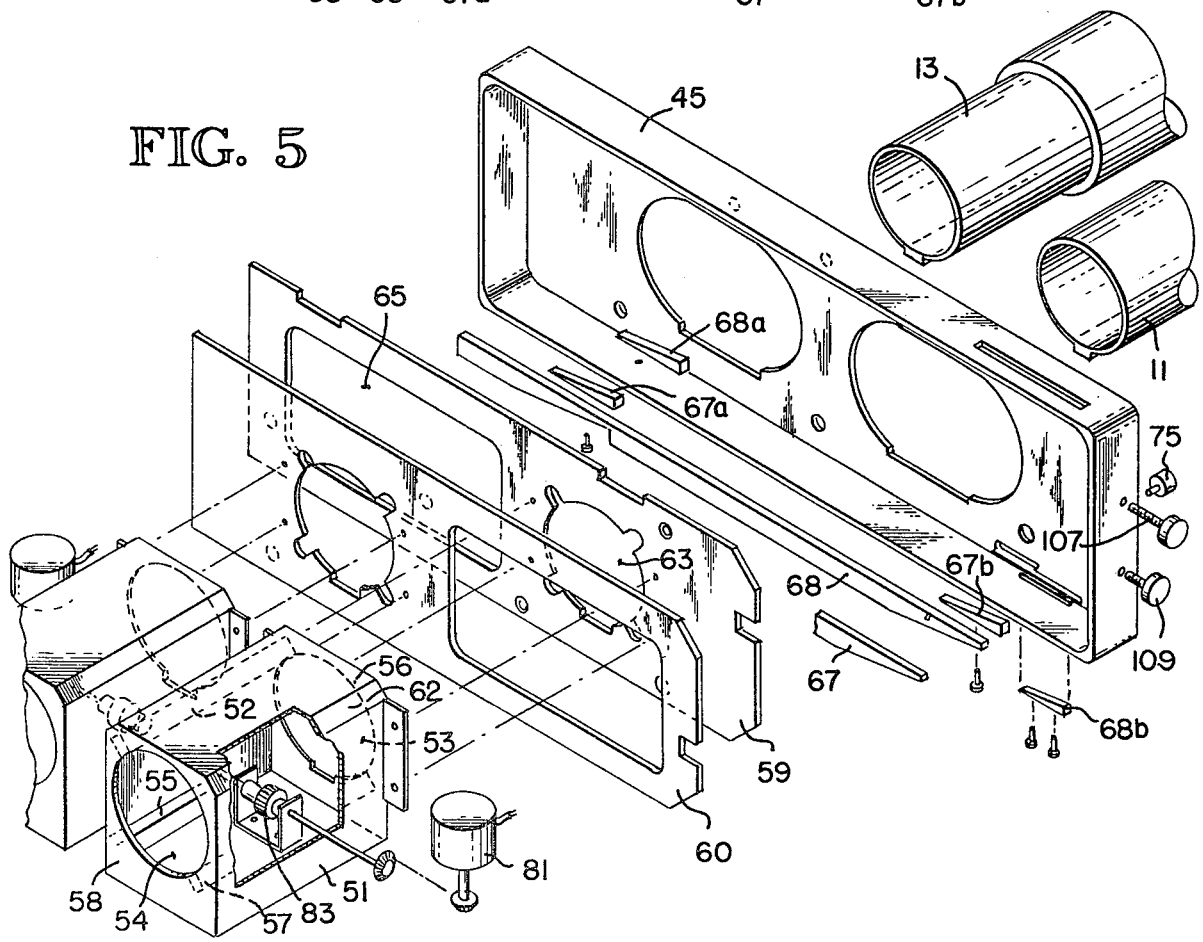
FIG. 5 is an exploded view of the front end assembly of the projector of FIG. 1.

The means for moving cover plates 59 and 60 and hence lenses 11 and 13 from side-to-side is shown most clearly in FIGS. 3, 4 and 6. A vertical support plate 87 is positioned slightly to the rear of the rear cover plate 60, and towards the right side of the front end assembly (looking toward the screen), i.e. between the right side 89 of the projector and the right lens assembly. Support plate 87 is slightly greater than half the height of the front end assembly, and is parallel to the lens plates, leaving a space between the support plate 87 and the cover plates 59 and 60.

A horizontal pin 91 is mounted through a bushing on support plate 87 near the top thereof and is rotatable relative to support plate 87. An elongated lever arm 93 is connected to horizontal pin 91 and rotates therewith relative to support plate 87. Lever 93 extends upward through a slot in the upper surface of the front end assembly, and terminates in a button 95, which is designed to be manipulated by an operator. Lever 93 extends downward from pin 91 to near the bottom of rear lens plate 60. Extending directly rearwardly from the back surface of lens plate 60 is a drive pin 97. Drive pin 97 is positioned substantially in vertical alignment wih pin 91 when lever 93 is vertical, and is located near the bottom of the rear lens plate 60, so that when lever 93 is in a vertical position, the edge of the lower end of the lever abuts against drive pin 97.

A slotted arm 99 is also connected to pin 91, between lever 93 and support plate 87, and rotates with pin 91 relative to support plate 87. Slotted arm 99 extends above support plate 87, but does not extend to the top edge of the lens plates. A roller 101 which extends from the right lens box 51 mates with the slot 103 in the upper end of slotted arm 99. Roller 101 is supported for rotation about an axis by a frame 105 which in turn is secured to the right lens box 51, which as described above extends through rear lens plate 60 and is fixed to front lens plate 59. The left lens box 52 is secured to the rear lens plate 60. Alternatively, roller 101 and frame 105 could be replaced by a link connecting slotted arm 99 to lens box 51. Drive pin 97 engages the other end, which is also slotted, of slotted arm 99.

Movement of lever 93, by manipulation of button 95, from one end of its range of movement to the other, results in simultaneous movement of the lens boxes 51 and 52, and hence lenses 11 and 13, either toward or away from each other. When lever 93, and hence slotted arm 99, are in a vertical position, the lens boxes 51 and 52, and hence lenses 11 and 13, are at the midpoint in their respective ranges of travel. As lever 93 is moved toward the right, rotating pin 91 in plate 87, the lower end of the lever pushes against drive pin 97, moving the rear cover plate 60 and its associated left hand lens box and lens, and the bottom end of slotted arm 99, toward the left hand edge of the projector. The rotation of pin 91 results simultaneously in the movement of the top end of slotted arm to the right, the front lens plate 59 and its associated right hand lens box 57 and lens 11 being pulled to the right, because roller 101 is engaged in slot 103 in the top end of the slotted arm.

Thus, the lever 93 pushes the rear lens plate which simultaneously causes the front lens plate to be pulled in the opposite direction, until the stop is reached. Such an arrangement results in a precise, repeatable movement of the mechanical system. In the other direction, when lever 93 is moved to the left, the bottom of the lever no longer moves the rear plate; instead, the lever rotates pin 91, which rotates slotted arm 99, the top of slotted arm 99 moving to the left, moving the front lens plate and the right hand lens box to the left through roller 101 and frame 105. Simultaneously, the lower end of slotted arm 99 moves to the right pulling pin 97 and the rear lens plate 60 with it. The movement in this direction is also terminated by a stop, as described in detail hereinafter. Such an arrangement insures that once the stops are set, the movement of the lenses will be exactly repeatable.

The range of movement of the lens plates, and hence the lenses, is defined by stops 107 and 109, which are positioned at the right hand edge of the front plate 45. In the embodiment shown, they are machine screws, and the length of the portion which extends into the front end assembly may be conveniently changed by turning the screws. The length of the stops inside the assembly determines the range of movement of the lenses. The topmost stop 107 is positioned so that the portion thereof inside the front end assembly mates with the edge of the rear lens plate. The front lens plate in the vicinity of stop 107 is cutout, so that only the rear lens plate contacts stop 107. The bottom stop 109 contacts the edge of the front lens plate, while the rear lens plate has a cutout portion in the vicinity of stop 109.

When lever 93 is at its rightmost position, in which the lenses are farthest apart (FIG. 4), the front lens plate contacts bottom stop 109 and further movement of both lens plates is terminated. Correspondingly, when lever 93 is in its rightmost position, in which the lenses are closest (FIG. 3), the rear lens plate contacts top stop 107, and further movement of both lens plates is again terminated. Such an arrangement permits precise movement of both lenses, without any slop or lost motion in the movement. Thus, a more accurate and precise alignment of the two images on the screen is possible.

Figure 21:
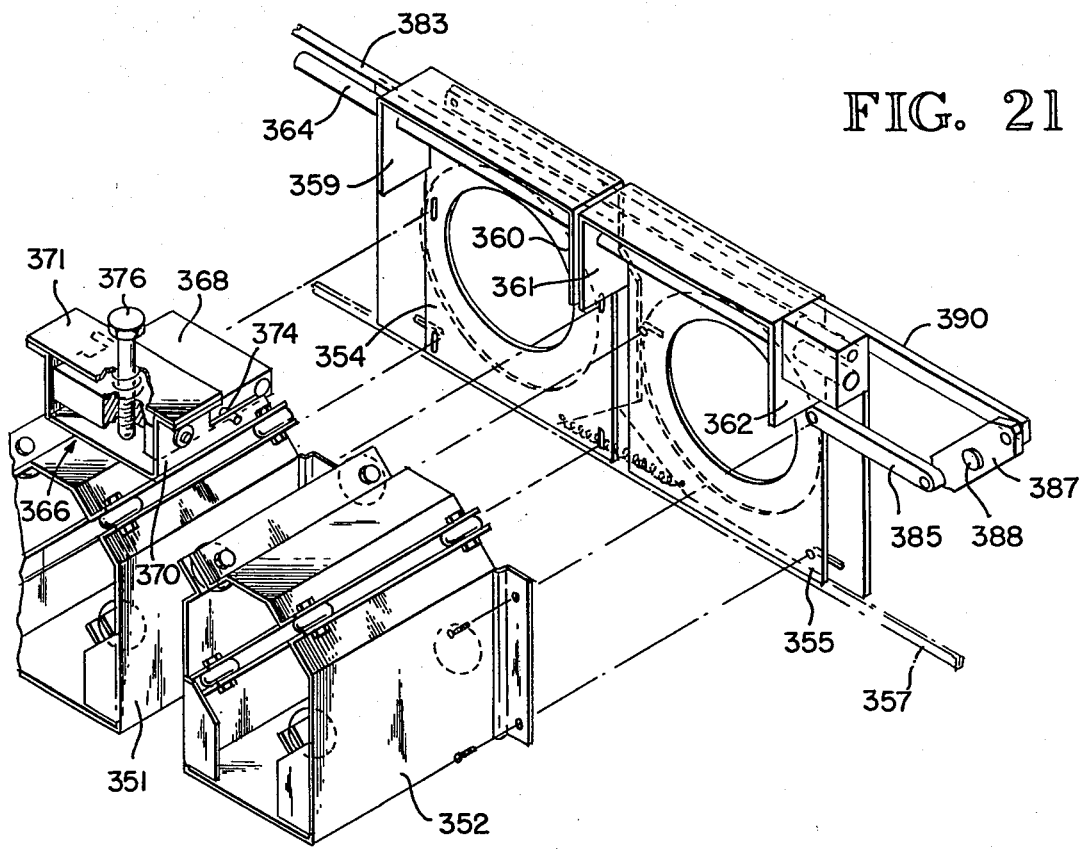
FIGS. 21 and 22 show an alternative embodiment of the front end assembly.
Figure 22:
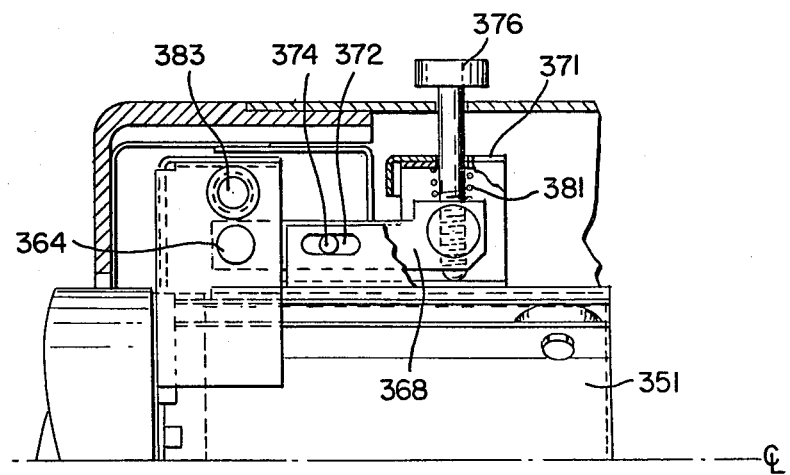

This system, in which the projection lenses move laterally from side to side results in a capability for precise alignment of the images, and permits the images on the screen to be precisely overlapped and/or separated without substantial distortion, specifically, substantially without keystoning. Another embodiment of the lens moving system is shown in FIGS. 21 and 22, described in detail in later paragraphs.

FIG. 7 shows in simplified form the effect on the images by moving the two lenses laterally relative to each other in the present invention. The projector is shown in outline form at 120 and a screen at 127, the projector including two image projection systems, each system including a light source 121, a slide 123, and a projection lens 125. The projection lenses have an angle of acceptance which is typically much wider than the width of a slide. The inventors have discovered that as the projection lenses are moved laterally towards or away from each other, with the longitudinal axes of the lenses remaining parallel, the images on the screen will move a distance which is substantially more than the distance moved by the projection lenses, substantially without keystoning distortion, due to the altered light paths through the image projection systems caused by the new physical relationship between the slides and the projection lenses.

Hence, with the arrangement shown, the images presented on the screen can be completely separated, as shown by the images marked "b" in FIG. 7, by moving the lenses away from each other, while alternatively, the two images can be precisely overlapped, as shown by the image marked "a", or any other degree of overlap, at any screen distance. This is a significant enhancement in the image capability of a slide projector.

It should be understood that the lateral movement of the projection lenses may be powered via a motor, providing responsive, fast control over the position of the two images. Further, the motion of each lens can be controlled separately. This results in a dynamic control over the position of the two images, and can result in many creative visual affects, as well as substantially increasing the flexibility of audio-visual presentations.

Figure 9:
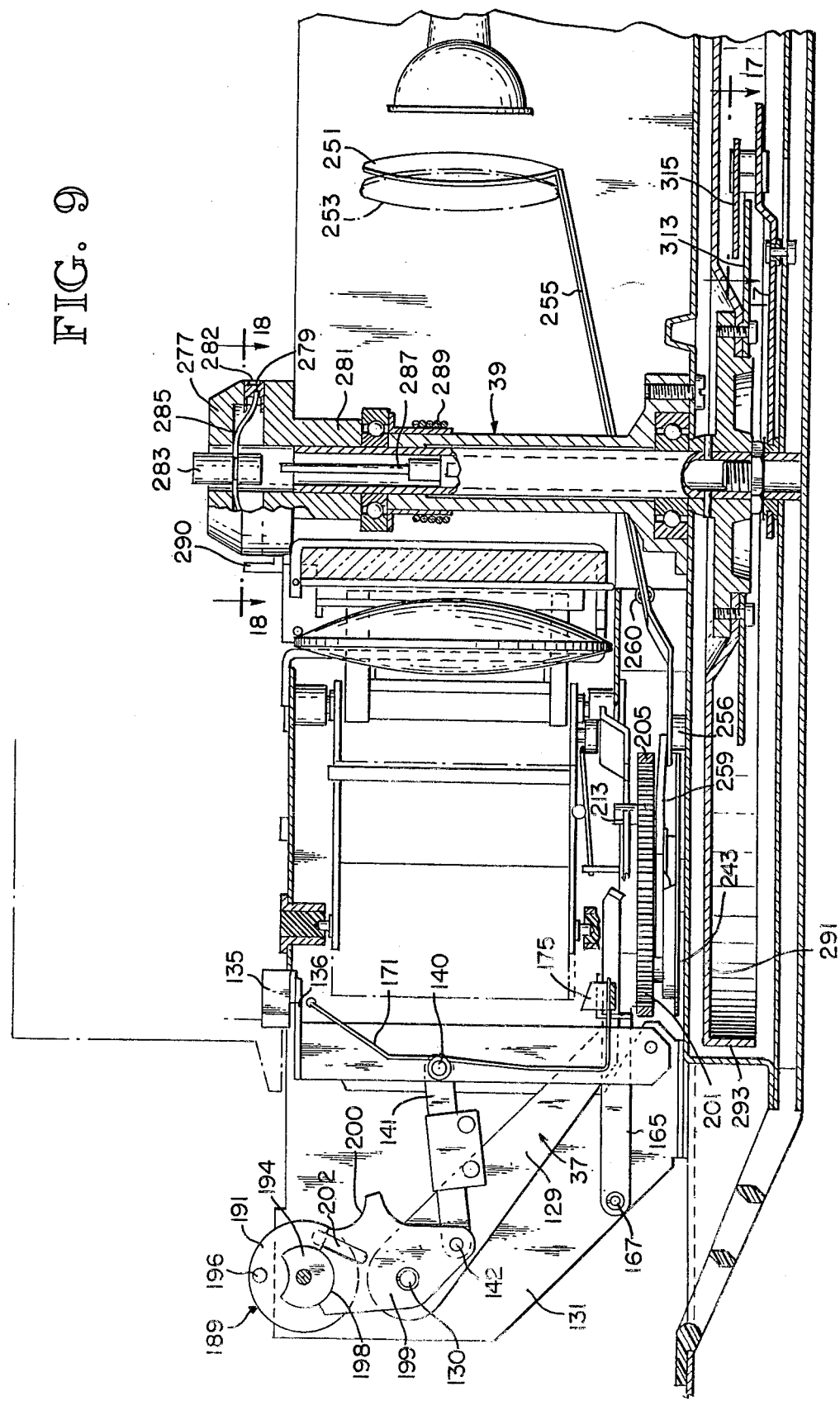
FIG. 9 is a longitudinal sectional view taken along lines 9—9 in FIG. 2, showing the primary components of the slide projector of FIG. 1, with the exception of the front end assembly.
Figure 11:
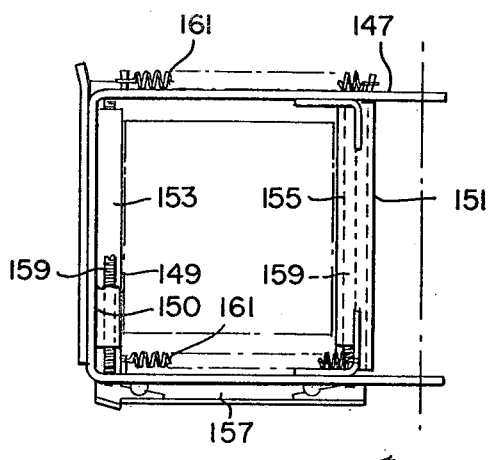
FIG. 11 is a front view of one of the slide gates of the projector of FIG. 1.

FIGS. 8 and 9 show most of the various elements which are involved in handling a slide as it moves from an original position in the slide tray into one of the slide gates, when the one slide gate is in its load position, then with the slide gate to the project position where it is projected onto the screen, then with the slide gate back to the load position of the gate, and then from the slide gate back to its original position in the slide tray.

In a typical operational sequence, in which a desired slide is to be retrieved from the slide tray, assuming that one slide gate is in its load position, and the gate is now ready to receive a slide, the slide lifter 37 is in its raised position, slightly through the opening 35 in the plate 36, adjacent the slide tray retaining pan, prior to the slide tray starting to move to the position where the desired slide can be dispensed through opening 35. The slide lifter includes an elongated arm 139 which is mounted for rotation about one end thereof on a mounting pin 130 which is fixed in a vertical mounting plate 131. Mounting plate 131 is positioned approximately midway between the two opposite sides of the projector, extends approximately the full height of the interior of the projector, and is positioned in the vacant area between the two lens boxes. Mounting pin 130 is positioned toward the front of the mounting plate 131 at approximately midheight. The elongated arm 129 of the slide lifter extends rearward of the projector parallel to the longitudinal axis of the projector, and is curved or bent in an upwards direction at about its midlength. At the free end of the elongated arm is a small bar 133, approximately one inch in length, which extends at right angles to the elongated arm. The top of the bar 133 is rounded, and it is this top surface which contacts the bottom of the slide as a slide is lifted from the gate back into the slide tray, and on which slides in the slide tray ride over when the slide tray is rotated.

When slide lifter 37 is rotated about mounting pin 130, so that the top of the bar 133 is adjacent the opening in the retaining pan of the slide tray, a slide tray latch 135 is released, permitting slide tray 15 to rotate to the desired position. The system for moving the slide tray and for ascertaining the correct position of the slide tray will be explained in more detail hereinafter. The tray latch 135 in the embodiment shown is a short rectangular bar which extends through a slot in plate 36, mating with the depending lugs (not shown) of a conventional 80 slide circular slide tray or causing locking of a 140 capacity slide tray. The latch is approximately the same width as the distance between two adjacent lugs on the 80 capacity tray, and can mate appropriately with the physical features of the 140 capacity slide tray so that it accurately positions slide tray 15 each time the tray is locked. Further, the position of tray latch 135 is fixed relative to the loading position of the gates to insure the accurate alignment of the slide tray and the gates during load and unload.

The lower end of latch 135 is connected to a horizontal extension 136 of the upper end of vertical arm 139 which is positioned to the right of mounting plate 131, approximately at the rear edge thereof. At approximately the midpoint of vertical arm 139 is connected a horizontal member 141 which extends toward the front of the projector. The forward end of the horizontal member is connected to a dual geneva drive element which is explained in more detail hereinafter. Briefly in operation, as the forward end of horizontal member 141 is rotated, in a manner which will be described hereinafter, the rear end of the horizontal arm moves longitudinally over a range of approximately 0.2 inches, which results in the horizontal extension 136 at the top of vertical arm 139, and hence tray latch 135, moving rearwardly. When tray latch 135 is at its rearmost position, slide tray 15 is free to rotate, while, when tray latch 135 is in its forwardmost position, the slide tray is locked, because the tray latch fixes the tray as explained above.

Following movement of the lifter to its raised position and the unlocking of the slide tray, the slide tray will rotate until a position is reached where the slide compartment containing the desired slide is directly over the opening 35 in plate 36 in the top surface of the projector. The desired slide at the point rests on the lifter bar 133, and the tray is locked. The lifter is then lowered permitting the slide to drop with the lifter through the opening 35 into the slide gate which is in the load position, such as for instance, slide gate 33.

The slide gates and a portion of the image projection systems to the rear of the gates are covered with an upper plate 143. This plate extends across the projector, and covers the upper part of the slide gates. A longitudinal opening is provided in upper plate 143, directly beneath the corresponding opening 35 in plate 36. This longitudinal opening is bulged out in the center, as is opening 35, to permit the slide lifter bar 133 to extend partially therethrough. A slide guide 145 is provided about the opening in upper plate 143, extending slightly above and below upper plate 143. The upper portion of the guide 145 is slightly flared outwardly, so that it acts as a funnel for the slide to pass through the opening in correct orientation for entry into a slide gate. The flared or funneled entry to and through the opening in upper plate 143 minimizes the possibility of a slide being jammed against the edges of the opening due to an improper orientation or position of the slide.

The slide gate 33, into which the slide drops, such as by gravity in the embodiment shown, is similar in general appearance to that shown and described in U.S. Pat. No. 4,165,161 to Kramer, supra. Slide gate 33 generally comprises a frame 147 and face and side clamps 149 and 151 which clamp the slide to the frame. A narrow lip 150 extends down the interior surface of the two side surfaces of the frame 147. The slide is pressed against lip 150 and the other side of the frame by by the face and side clamps 149 and 151.

Face clamp 149 comprises two relatively thin elongated fingers 153, 155 connected by a base plate 157. The base plate 157 extends underneath the frame, while the two fingers 153, 155 extend upwardly along the interior of both sides of the frame. The face clamp 149 is pivoted with small balls at points along each edge of the base plate to the frame. Springs 159 bias the face clamp 149 such that the fingers 153 and 155 press against the interior lip 150. Thus, a slide positioned between the fingers and the lip will be clamped in place by the action of the biasing springs 159.

The frame and face clamp 149 are made from a nonmagnetic material. Side clamp 151 is a thin narrow plate of magnetic material in the embodiment shown which is positioned along that edge of the frame 147 which is rearmost when the slide gate is in its load position. The narrow plate is biased toward the other side of the frame 147 by springs 161 such that it tends to press the slide against the other side of the frame 147. Thus, a slide will be clamped against the other side of the frame by the action of the side clamp 151. The face and side clamps, the lip 150, and frame 147 furthermore are shaped at their tops to act as a funnel for the slide, aiding in the proper movement of the slide into the gate when the clamps are open.

In operation, after gate 33 has swung into its slide load position and any slide in the gate ejected, both the face clamp 149 and the side clamp 151 are opened against their spring biases, the face clamp by a mechanical arrangement and the side clamp by an electromagnet. After the slide drops into the slide gate through the slide guide 145, the side clamp is first released, so that the slide is moved against the other side of the frame comprising the slide gate, and then the front clamp is released, by virtue of the gate moving away from the load position, resulting in the slide being clamped against the internal lip 150. The slide is now accurately positioned in the slide gate, ready to be projected.

The rearward movement of vertical arm 139, which unlocks slide tray 15, results in the lower end of the vertical arm 139 rotating slightly clockwise, so that the forward edge of the lower end, which is formed into a lip 163, moves upward against a horizontal lever 165, which is pivoted at its forward end about a pivot pin 167 in mounting plate 131. The rear portion of the lever 165 is curved to extend around vertical arm 139, terminating in a free end 169 which is just beneath the near edge of the base plate of the slide gate when the slide gate is in its load position. The free end 169 of the horizontal lever 165 is raised slightly by the rearward movement of vertical arm 139, at which point the slide gate is already in its first position.

As the free end 169 of the horizontal lever rises, it contacts base plate 157 and forces the base plate upward, thus pivoting fingers 153 and 155 out away from the interior lip 150 of the frame 147, against the action of springs 159. The face clamp 149 is thus opened.

A wire form 171, which lies adjacent vertical arm 139 and is looped around connecting pin 140 in vertical arm 139 has its top end secured to upper plate 143, so that its lower end is free to move. Wire form 171 thus extends from the lower surface of the upper plate 143, where it is secured, to connecting pin 140, around which it is wound, down to near the lower edge of vertical arm 139, where it is bent at a right angle so that it extends substantially horizontally for a distance of approximately ½ inch, ending adjacent an upstanding portion 175 of a tab 173, which is pivotable about a pivot pin 177. Tab 173 is normally biased away from the bottom of the slide gates in the load position by a wire form 179.

When vertical arm 139 moves rearward, so that tray latch 135 unlocks the slide tray, and the free end of lever 165 raises the base plate 157 on the slide gate in the load position, the lower extension of wire form 171 presses against upstanding portion 175 of tab 173, against the bias of wire form 179, moving tab 173 into position beneath base plate 157, such that base plate 157 rests on the upper edge of upstanding portion 175 of tab 173. At this point, base plate 157 is held up by both the free end of horizontal lever 165 and by the upstanding portion 175 of tab 173, and the face clamp 149 is open.

As indicated above, side clamp 151 is biased by springs 161 so that it presses against the edge of the slide. Side clamp 151 is opened by an electromagnet (shown representationally at 152) which is positioned at the rear edge of the slide guide, near the top and bottom of the slide gate, so that when the slide gate is in its first position, the electromagnet is relatively close to side clamp 151. When the electromagnet is activated, after the slide gate is in the load position and the slide in the gate, if any, is ejected, side clamp 151 is moved outwardly from the slide gate frame 147 against bias springs 161.

After a slide gate is swung into its load position, and both the face clamp 149 and side clamp 151 having been opened as described above, a slide is free to fall into the slide gate from the slide tray. At this point, vertical arm 139 is returned to its original, forward position by forward movement of horizontal member 141. This results in the tray latch 135 also moving forwardly, locking the slide tray again. Also, horizontal lever 165 drops back down to its lowered position, and the horizontal extension of wire form 171 also returns to its initial position. The free end of lever 165 thus drops away from the base plate 157, but the base plate 157 does not move, because it continues to be supported by upstanding portion 175 of tab 173, preventing tab 173 from rotating back to its original position and base plate 157 from moving to its normal raised position. Face clamp 149 thus remains open. The lifter 37 is then lowered, allowing the slide to move by gravity into the slide gate. Just before the slide gate begins to move to its project position, the side clamp electromagnet is deactivated so that springs 161 bias side clamp 151 back against the side of the slide. The side clamp 151 will push the slide against the other edge of the slide frame such that the desired side-to-side orientation of the slide is achieved.

The slide gate, when the loaded slide, now correctly positioned sideways, is moved away from its load position, toward its project second position, and, as it moves off of tab 173, the face clamp will pivot to its clamped position, and tab 173 will return to its original position by the action of wire form 179, or alternatively, a spring, the original position of tab 173 being out of the way so that the other gate can move in. In the clamped position of the face clamp, fingers 153 and 155 press the slide against the interior lip 150 of the slide gate frame 147. The slide is now fully clamped, and the slide gate swings to its project position.

The above sequence occurs each time that a slide is loaded into a slide gate. The slide remains clamped from the point in time that the gate begins to move from the load position, through the time it is in the project position, until after it is back in the load position and the lifter has moved the slide up out of the slide gate back into its original position in the slide tray. Thus, lifter 37 moves the slides out of the slide gate against the action of both the face and side clamps, which insures accurate alignment of the slide with the slide tray for re-entry.

Figure 10:
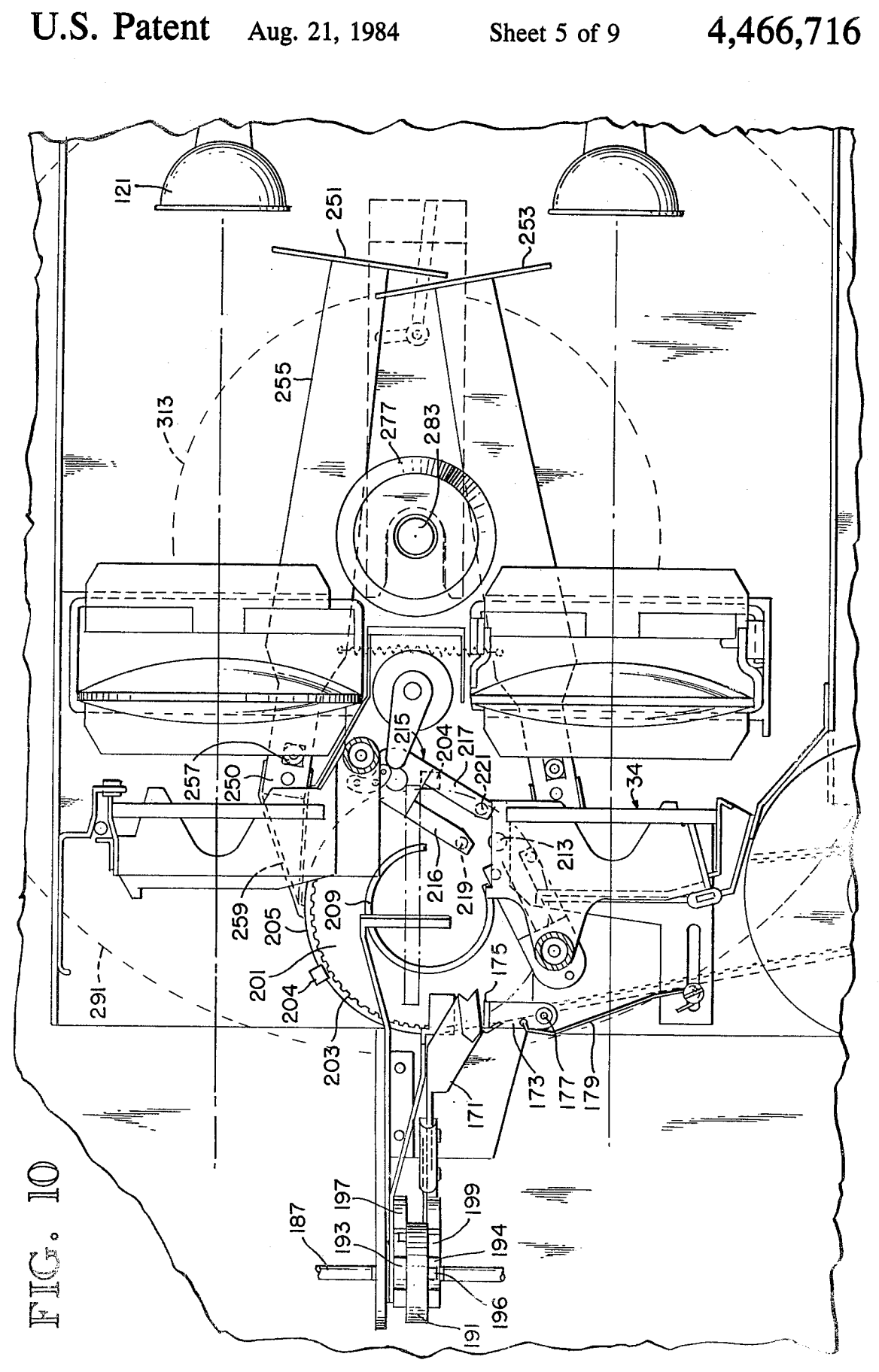
Figure 23:
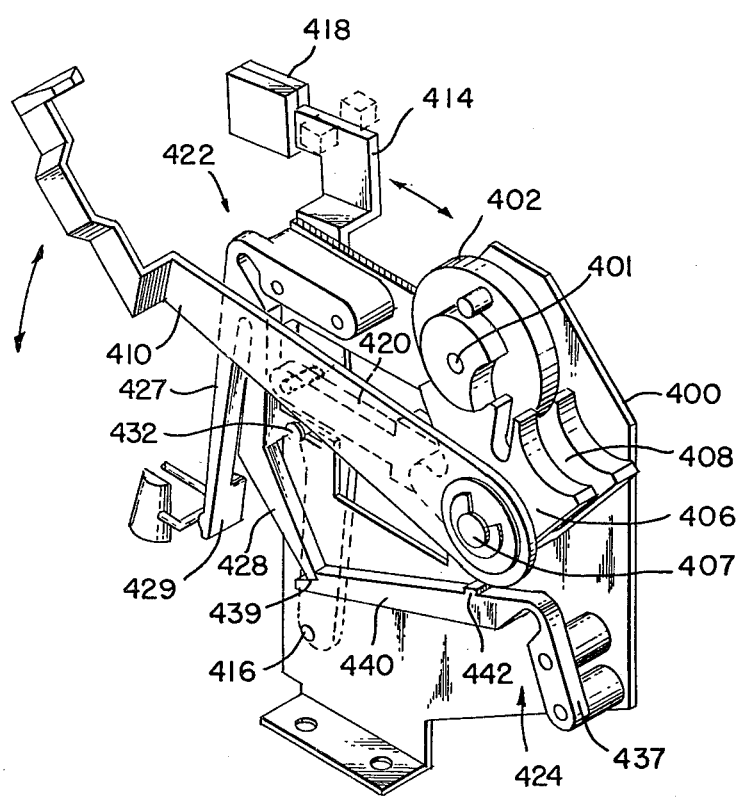
FIG. 23 shows an alternative embodiment of certain portions of the slide handling control structure of FIGS. 8 and 9.

The control and timing for the operations of slide lifter 37 and horizontal member 141, with horizontal member 141 in turn controlling tray latch 135 and slide clamps 149 and 151, is achieved by the structure shown in FIGS. 8 through 10. Another embodiment of a portion of the structure of FIGS. 8-10 is shown in FIG. 23 and described in detail, along with a somewhat different slide clamping structure, in later paragraphs. A stepper motor (not shown) located at one side of the projector drives a set of gears (not shown) which in turn rotate a thin horizontal rod 187 which runs approximately the width of the projector, and extends through mounting plate 131 near the top thereof. Mounted both on the rod 187 and on the mounting pin 130 which extends through the mounting plate 131 is a cam and cam follower arrangement referred to as a dual or double geneva. The dual geneva shown generally at 189 includes a disc 191 which is positioned on the rod 187 and rotates therewith. The disc 191 includes central raised portions 193, 194, circular in outline, on both surfaces of the disc, and small drive pins 195, 196 which extend outwardly from both surfaces near the outer edge thereof. The drive pins 195, 196 on the opposite surfaces of the disc are separated rotationally by approximately 113°. There is a cutout portion in each of the raised portions adjacent the drive pins to allow clearance for the passage of the mating portions of each geneva element.

Positioned on either side of the disc 191 are plates 197 and 199, such that a portion of disc 191 is positioned between plates 197 and 199. Plates 197 and 199 are mounted on the mounting pin 130 and rotate therewith. Plate 197, adjacent mounting plate 131, is connected to slide lifter 37 while plate 199 is connected to the free end of horizontal member 141 through pin 142. Thus, plate 197 controls the movement of slide lifter 37, while plate 199 controls the locking and unlocking of the slide tray and the slide clamping.

Each plate 197, 199 includes a top drive surface having two arcuate portions 198 and 200, which are symmetrical about a narrow central slot 202. The inner edges of the arcuate portions, i.e. the edges at the slot, are somewhat higher than the outer edges. The arcuate portions 198 and 200 are configured to mate with the raised central portions 193, 194 on the opposite surfaces of the disc 191, and the central slots adapted to receive the drive pins 195 and 196. Thus, because there is a double geneva action, involving disc 191 and plates 197 and 199, the overall structure is referred to as a dual or double geneva.

As the disc 191 rotates, through the action of the stepper motor 183, the drive pins on the disc will move into their associated slots on the plates, and as the disc rotates further, the plates will rotate about mounting pin 130, due to the action of the drive pins, with the mating surfaces on the plate and disc (the arcuate portion on the plate and the raised central portion of the disc) guiding the relative movement of the two parts. The rotation of the two plates results in the movement of the slide lifter arm and the horizontal member 141 which result in the movements of the tray latch, the slide lifter and the slide clamping elements, all described in detail above.

The angular separation between the drive pins 195 and 196 determines the relative timing of the lifter action and the action of the horizontal member. The tray lock, the slide lifter, and the slide clamps 149 and 151 thus, by the arrangement of the double geneva 189, operate in a predetermined sequence which is important to the proper operation of the projector. For instance, it insures that the tray will not move unless the lifter is up; otherwise, slides could fall into the projector.

FIGS. 7 and 8 through 9 show the structure for moving the slide gates 33 and 34 between their load and project positions. A circular plate 201 is mounted below the slide gates, approximately centered on the slide gates when they are in their load position. On the rim of the plate 201 is a set of teeth 203, which mate with a ribbed belt 205 which in turn is driven by a stepper motor 207. A thin circular ridge 209 projects upwardly from the upper surface of the plate 201 along a line which is approximately one-half the diameter of the plate. The circular ridge 209 is not closed, as there is a substantial gap between the two ends of the ridge.

In the embodiment shown for a plate 201 having a diameter of approximately 2 inches, and a ridge 209 having a diameter of approximately 1.2 inches, the length of the arcuate gap in the ridge is approximately 64°. At the center of circular plate 201 is a small nylon pad (not shown) upon which slide lifter 37 rests when it is in its lowered position. A small circular post 213 extends upwardly a small distance from the upper surface of the plate 201. The post 213 is located near the rim of the plate 201, at a point which is on an imaginary line which extends from the center of the plate 201 approximately through the center of the gap in ridge 209.

Each slide gate is pivoted about top and bottom pivot points. The right hand slide gate 33 moves counterclockwise from the project position to the load position, and clockwise from the load position to the project position with its axis of rotation coincident with the side of the slide gate nearest the center of the projector. Left hand slide gate 34 also rotates counterclockwise from the project position to the load position and clockwise from the load position to the project position, although its axis of rotation is removed from the slide gate itself, at a point which is forward of the slide gate and towards its right edge when the slide gate is in its project position.

Each slide gate is driven by the action of a forked horizontal member, e.g. member 215 for gate 33. Near the end of each leg 216, 217 of the forked member 215 are two depending guide pins 219 and 221. The forked member 215, when viewed from the side, is in the shape of a flattened S, with the lower portion comprising the two legs 216, 217 and the upper portion being linked to the slide gate. The fork for the right hand gate 33 is linked to the gate through a reverse link and the fork itself pivots separately from the gate. Alternatively, a gear arrangement between the gate and the fork could be used to provide a reliable reverse movement. The fork for the left hand gate 34 is fixed to the gate and the gate pivots with the fork.

When both of the slide gates are in the project position, the post 213 is appropriately 45° clockwise from top center, as shown most clearly in FIG. 10, and the opening defined by the two legs of each forked member are adjacent the post, opposing each other, with the depending pins from each leg terminating close to but not touching the upper surface of the circular plate 201 in the area between the ridge 209 and the outer rim of plate 201.

In operation, as the circular plate 201 is rotated in one direction or the other, the stepper motor, through ribbed belt 205, will post 213 into the forked portion of one of the forked members. Further rotation of plate 201 in that direction will result in a rotation of the forked element in which the post 213 is positioned, clockwise for the forked member for slide gate 33, counterclockwise for the other forked member. The forked member for the right hand slide gate 33 is linked to the slide gate in such a way that slide gate 33 moves counterclockwise between its project and load positions as its associated forked member moves clockwise, and vice versa. The action is different for the left hand slide gate 34, as a counterclockwise rotation of the forked member results in a counterclockwise rotation of the slide gate moving from the project position to the load position.

The angular rotation of plate 201 necessary to accomplish full movement of one of the slide gates between the load and project positions is approximately 113°. The depending guide pins 219 and 221 on the legs of the forked member are used in conjunction with the ridge 209 to help prevent the accidental uncontrolled movement of a slide gate when the post 213 is not engaged in the fork, and also to prevent vibration from being transferred to a projected image. Magnets (not shown) also help to retain the slide gates in the project position once the gates are moved to that position. The pins would help to prevent the gate swinging uncontrollably should a gate accidentally be jarred loose from the holding action of the magnet.

The slide handling system includes several sensing devices for ascertaining the position of several of the elements described above. The sensing devices in the embodiment shown are optical, and comprise an infrared light source and a corresponding infra-red detector. The output of these devices is an electrical signal which is indicative of the position of the element being sensed. This information is then used by the control section of the projector to properly sequence the various operational elements of the projector. It should be understood, however, that other optical means, and even mechanical sensing means, can be used to achieve the same result.

A first sensing device is located on opposite longitudinal sides of the slide guide 145 in upper plate 143, a short distance below the slide opening in plate 143. This sensor ascertains first that a slide has entered the slide guide by detecting a light blockage, i.e. the transition from light to dark, one transition. Secondly, the successful entry of a slide into a slide gate is ascertained when the sensor again detects light, i.e. the transition from dark to light. Thus, two transitions will occur for a successful slide entry. If the sensor detects a first transition when a slide gate is not in its load position, certain remedial steps may be implemented, such as immediately raising the lifter. If a slide happens to become jammed in the guide and does not reach the slide gate, when a gate is ready to receive it, the sensor will detect only one transition, and the projector will be stopped, with an indication of a jam perhaps, to permit the operator to release the slides. Jamming of slides as they move from the slide gates to the slide tray is similarly detected. Hence, the sensing means in the slide guide 145 insures proper movement, at the proper time, or slides between the slide tray and the slide gates.

Figure 16:
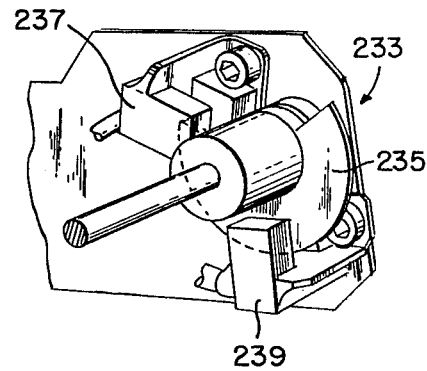
FIG. 16 is an oblique view showing an optical sensing means in the projector of FIG. 1 for determining the relative positions of several elements in the slide handling system.

A second sensing means 233, shown in FIG. 16, is located at the end of rod 187, at the left hand side of the projector. On the end of rod 187 is a thin plate 235 which extends radially outwardly from the rod, around the rod approximately 230°. Two infra-red sensors 237 and 239 are positioned so that plate 235 passes between the light source and the detector of each sensor as the rod 187 rotates. When the plate is between the light source and the detector, the sensor is referred to as being "dark" while when the plate is not between the light source and the detector, the sensor is "light". The sensors 239 and 237 are separated by an angle of approximately 113°.

Second sensing means 233 in operation detects four positions and four zones of the double geneva element 189, and hence four relative positions of the lifter and the tray lock. Plate 235 is secured to rod 187 at such an orientation, relative to the position of the double geneva and the position of the two sensors 237 and 239 that the operation sequence is as follows: (1) when both sensors are light, the lifter 37 is in the down position and the tray latch 135 is forward, so that the tray is locked; (2) a slight rotation of rod 187 counterclockwise sufficient to begin to raise lifter 37 will rotate plate 235 sufficiently to cause sensor 237 to go dark, although sensor 239 will remain light; (3) further counterclockwise rotation of rod 187 sufficient to cause lifter 37 to reach its fully raised position causes sensor 239 to go dark as well; (4) still further rotation of the rod, sufficient to cause the slide tray to unlock, causes the sensor 237 to go light. At this point the tray is moved, and the rod 187 is rotated clockwise to lock the tray and lower the lifter, to the point where both sensors are again light. Stops are positioned on the rod linkages to insure that overrotation is not possible.

The first transition detected by sensing means 233 thus is when sensor 237 goes dark, after both sensors have been light. This means that the tray is locked, that the lifter is down but has started to rise. At the second transition, sensor 239 goes dark as well. The lifter is now fully raised up but the tray is still locked. The third transition is when sensor 239 goes light when previously both sensors have been dark. The tray is now unlocked, and can be moved. When the rod is rotated back, and both sensors go light again, the tray is locked and the lifter is down.

The third sensing means detects rotation of circular plate 201 which moves the respective slide gates, and thus detects the position of the slide gates. A thin disc 243 of somewhat larger diameter than circular plate 201 is positioned below plate 201, and is secured so as to rotate therewith. Two infra-red sensors are positioned about disc 243. Disc 243 is configured relative to the position of the two sensors as follows: when the right hand gates moves to the load position, the rear sensor is dark and the front sensor transitions to dark and stays dark. When the right hand gate reaches the load position, the rear sensor transitions to light. When the plate 201 is rotated back, the forward sensor will transition to dark as the left hand gate just begins to move to the load position. When the left hand gate is fully in its load position, the rear sensor again transitions to light; both sensors are thus light when the left hand gate is in its load position.

Thus, the positions of the slide gates, the slide lifter, and the tray lock can be accurately sensed, which is significant for reliable operation of the projector. The sensing devices, particularly the sensor in the slide guide, assist substantially in preventing slide jamming, which is important to the proper initiation of, and operation of, the machine.

The projector also has a pair of blackout flaps 251 and 253, one for each image projection system. The blackout flaps improve the optical quality of the image as one image replaces another on the screen, because, when activated, they immediately eliminate the persistent light from the image system which has just been turned off. Otherwise, the swinging movement of a slide gate, as it rotates away from the project position, with the persistent light from that image system continuing to reach the screen, causes a moving shadow on the screen which is quite distracting to the viewer.

The blackout flaps 251 and 252 are thin circular discs, approximately two inches in diameter, sufficient in size to block the image projection light source substantially completely. The blackout flaps move into and out of their respective image projection systems, positioned between heat filter 27 and the lamps. The blackout flaps 251 and 253 are pivoted into and out of position by elongated thin arms connected to the bottom of the flaps, such as that shown at 255 for blackout flap 251.

Figure 12:
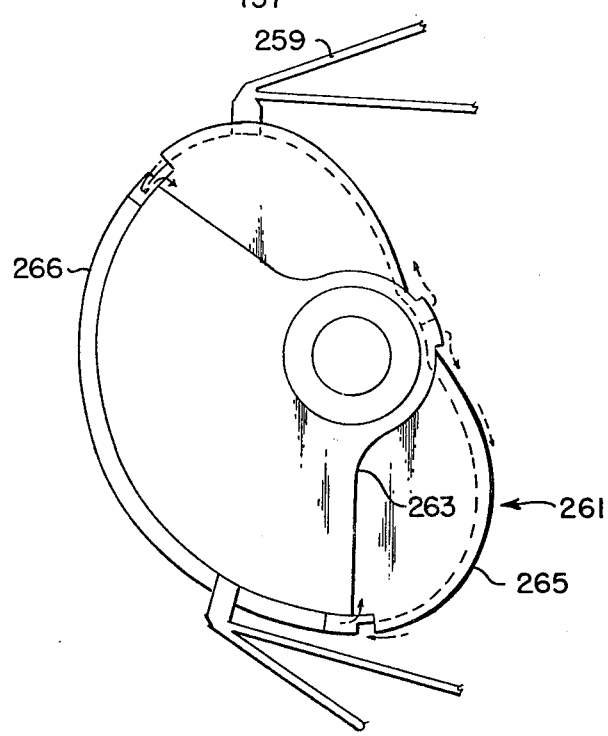
FIG. 12 is a bottom plan view of the cam which is secured beneath the geneva shown in FIG. 10 and which controls the movement of the blackout flaps used in the projector of FIG. 1.
Figure 13:
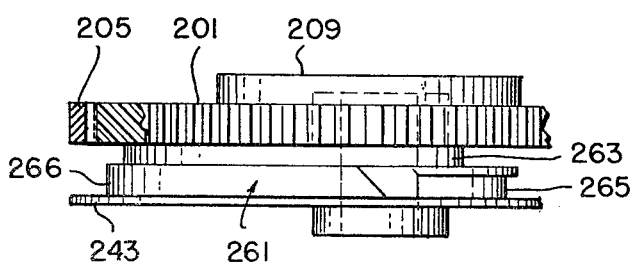
FIG. 13 is an elevational view showing the relationship of the slide gate geneva of FIG. 10 and the blackout flap cam of FIG. 12.

In operation, blackout flap 251 pivots with a pivot block 256, about pin 257. Blackout flap 253 has a similar arrangement. The movement of pivot block 256, and hence blackout flap 251, is controlled by a springed lever 259 which presses against a double heart-shaped cam 261 on the undersurface of circular plate 201. The configuration of the double heart-shaped cam 261 is shown in detail in FIGS. 12 and 13. The spring lever 259 is biased against the edge of the cam by a spring 260 (FIG. 9) which connects the spring levers of both blackout flaps and tends to draw them together against the cam 261. Cam 261 has dual upper and lower tracks 263 and 265, one for each blackout flap, as well as a continuous radius section 266. Upper track 263 is sharply contoured, as shown, so that the springed lever rotates rapidly, resulting in a fast movement of blackout flap 251. When the springed lever comes to one end of the track, i.e. at the point where the rotation of circular plate 201 reaches one extreme, the lever is forced into the lower track, by the configuration of the end of the track.

As plate 201 is then rotated in the opposite direction, the springed lever moves in the lower track. The lower track has a gradual ramp configuration, so that the blackout flap is moved out of the image projection system slowly, requiring relatively little power from stepper motor 207. When the plate is rotated to the other extreme of its range of movement, the springed lever reaches the other end of the lower track of the cam, which is configured to force the springed lever back into the upper track, so that the process of activating the blackout flap can be repeated for the next slide. Cam 261 is referred to a double heart-shaped cam, because it has the same configuration on opposite sides, one side for the springed lever for blackout flap 251 and the other side for the springed lever for blackout flap 253. While one of the blackout flaps is riding on either track 261 or 263, the other blackout flap is riding on track 266, which is constant radius, so that the flap does not move.

Figure 14:
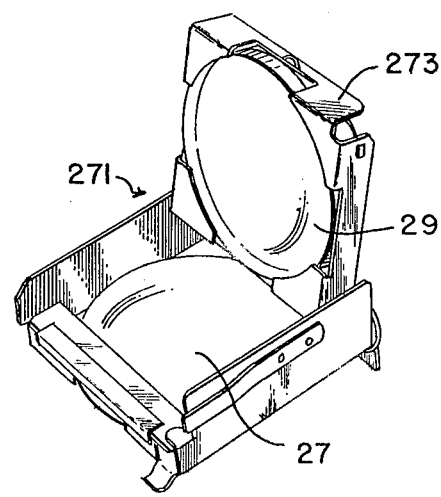
FIG. 14 is a perspective view of the removable heat filter/condenser lens assembly of the projector of FIG. 1.
Figure 15:
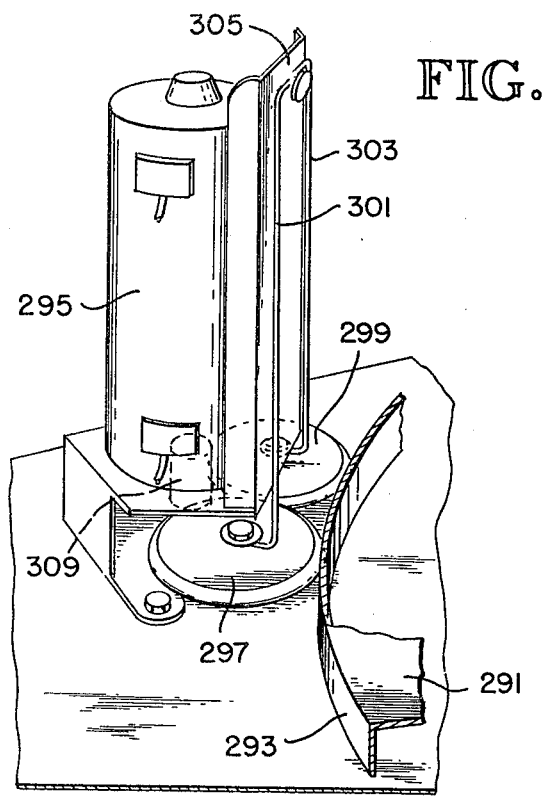
FIG. 15 is an oblique view of the means for driving the central hub of the projector of FIG. 1.

FIG. 14 shows the combination of the heat filter 27 and the condenser lens 29 present in each image projection system. In the embodiment shown, the heat filter and the condenser lens are supported in a frame 271, which is removably positioned in its image projection system by guides, clips, or the like. Condenser lens 29 is supported in the frame 271 by a subframe 273 which is pivotable relative to the frame 271 by means of pivot pins or the like on opposite sides thereof. Condenser lens 29 is held in the subframe 273 by a spring or the like (not shown), so that it may be conveniently removed for cleaning and/or replacement, if necessary.

Hence, frame 271 is removable from its place in an image projection system by the operator, and the subframe 273 pivoted away from frame 271. The condenser lens and/or the heat filter may then be removed, cleaned and then returned to subframe 273, which is then pivoted back, so that frame 271 with the filter and the lens may be conveniently inserted back into its image projection system.

The last principle system of the projector of the present invention is the tray control and drive system which is shown in FIGS. 9, 15, 17, 18. Slide tray 15 is secured to central hub 39, and supported by raised buttons on the top surface of plate 146. At the top of hub 39 is a thick disc-like element 277 which mates with the central opening in the slide tray. Element 277 has three contact elements 279 spaced radially around the circumference thereof. These contact elements are aluminum, and move in interior slots in the disc-like element outwardly towards the periphery of the disc element in a manner described hereinafter. The contact elements move against a rubber ring 282 which is positioned around the periphery of the disc-like element. Below disc-like element 277 is a tube-like member 281 which extends down to near the bottom of the projector, where it is mounted for rotation. Thus, hub 39 is rotatable.

The disc-like element 277 includes a central opening therethrough in which is supported a button 283, which is connected to a leaf spring 285 which in turn is connected to the contact elements 279. The button 283 is free to move vertically a short distance when a small force is applied. The spring is configured so that it biases button 283 at either the top or bottom of its range of movement. When the button is in a raised position, the spring tends to maintain the button in that position. When the button is raised, the contact elements are in a retracted position, the rubber ring is retracted, and the slide tray may be moved relative to the disc-like element.

When the button 283 is depressed to the other end of its range, spring 285 reverses configuration such that button 283 tends to remain depressed. In this position, spring 285 exerts outward pressure on the contact elements, which in turn force rubber ring 282 outwardly from the periphery of the disc element 277, effectively increasing the diameter of the disc-like element. When a slide tray is positioned on the disc-like element 277, and the button 283 is depressed, the resulting increased frictional contact between rubber ring 282 and the interior surface of the slide tray results in a nonslip contact between the disc element 277 and the tray.

Within tube member 281 is a rod 287. The top of rod 287 is below the lower end of button 283 when the button is raised. Tube element 281 is wound with a coil of wire, 289, which acts like an electromagnet. When the electromagnet is activated, rod 287 is moved upwardly, hitting the button 283 with sufficient force to move it to its raised position. Hence when it is desired to release the tray from the hub, an electrical current is directed through coil 289, which results in button 283 returning to its raised position, with that spring 285 returning to its original configuration. Rubber ring 282 is again in its retracted position and the slide tray can be removed.

The projector has several structural features which tend to insure proper alignment of the slide tray relative to the projector. The disc element 277 itself has a slight bulge or nipple 290 at a specific point on its circumferential edge, which mates with a matching cutout on the slide tray, to help insure that the tray is always loaded on the hub in the same relationship. Further, there is a lip on the projector case which rides over the front edge of the slide tray, which also assists in proper location of the tray. Tray latch 135, which fits precisely between two adjacent depending lugs on the 80 slide capacity slide tray further insures the desired relationship between the hub and the slide tray. An opening on the bottom of the 140 capacity slide tray mates with a pin in the plate at the top of the projector to precisely align the tray. The combination of the various elements disclosed above all help insure a proper, known orientation of the tray relative to the hub and a projector reference point.

Near the bottom of the hub 275 is secured a drive disc 291 (FIGS. 9 and 15) which has a diameter slightly larger than that of tray 15. Drive disc 291 includes an edge 293. Since disc 291 is connected to the hub 281, then as disc 291 is moved, the hub likewise moves and hence the slide tray moves as well. In the embodiment shown, disc 291 is driven by a pair of drive wheels 297 and 299, which in turn are driven by a DC motor/tachometer 295. The drive wheels are suspended in a horizontal orientation by elongated supports 301 and 303, which in turn hang from a frame 305 in such a manner that the supports, and hence the drive wheels, are free to move toward and away from each other. A spring (not shown) connecting the two supports 301 and 303 tends to bias the two drive wheels toward each other.

The drive wheels 297 and 299 have rubber rims, and bear against edge 293 of drive disc 201. A motor drive shaft 309 extends downwardly from motor 295 and bears against the surfaces of both drive wheels 297 and 299. As the driveshaft turns in one direction, both of the drive wheels are turned, but one of the wheels tends to provide the principle contact, and hence drive, for the disc 291 while the other drive wheel tends to follow. Rotation of the driveshaft in the other direction reverses the action on the drive wheels, so that the other drive wheel tends to be the principle drive for the disc, while the first drive wheel will be the follower. This arrangement results in a reliable frictional drive which provides adequate power to drive the slide tray.

Figure 17:
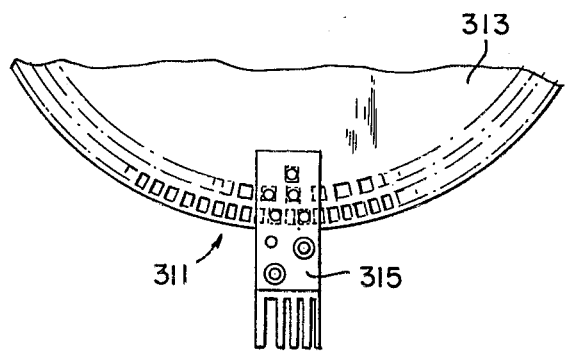
FIG. 17 is a top plan view of the slide tray sensing means.
Figure 18:
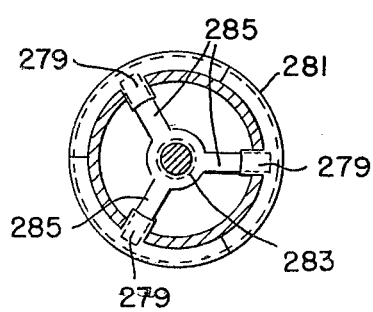
FIG. 18 is a sectional view of the central hub of the projector of FIG. 1, taken along lines 18—18 in FIG. 9.
Figure 20:
FIG. 20 is a sectional view of a portion of the front end assembly of FIG. 1, taken along lines 20—20 of FIG. 19.
Figure 19:
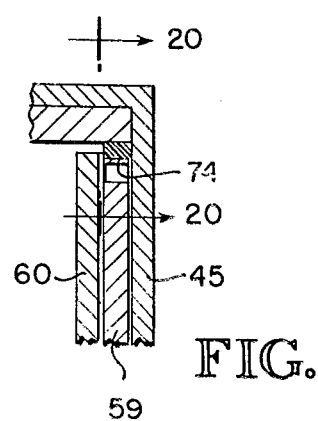
FIG. 19 is a sectional view of a portion of the front end assembly of FIG. 1, taken along lines 19—19 in FIG. 3.

A fourth sensing means 311, shown in FIGS. 9 and 17, continuously detects the position of the hub, and hence the slide tray, relative to a known reference point. Thus, the position of the slide tray is always known, an important feature of the projector of the present invention. In the embodiment shown, the sensing means includes a thin sensing disc 313 which extends outwardly from the hub and is attached to the hub a short distance beneath drive disc 291. At the outer edge of the sensing disc 313 in the embodiment shown are two rows of closely-spaced openings, and a third row containing one opening. The first row has 141 openings, to accommodate a tray with 140 slide compartments and an empty zero slot, and the second row has 131 openings, to accommodate a slide tray having 190 slide compartments and an empty zero slot. Slide trays with different numbers of compartments may be accommodated by substituting a row of openings corresponding to the slide tray capability. The single opening in the third row is the reference opening; this opening, in the embodiment shown, represents the zero position to the sensor. The tray alignment devices described above insure that the zero slide compartment in the tray is coincident with the zero reference opening in the sensing disc 313. The necessary rotational movement of the tray to address a particular compartment can thus be accurately controlled, providing a practical random access capability.

An infra-red sensor panel 315 is positioned about the edge of the disc. The sensor panel includes six sensors. A first sensor in the panel is positioned to detect the reference opening, the second and third sensors are positioned to detect the first row of openings, the fourth and fifth sensors are positioned to detect the second row of openings, and the sixth sensor is a light level reference sensor, as clarified hereinafter. The light level necessary to effect a transition indication was selected to be half-way between the level at which the sensor is dark and the level at which the sensor is fully light; this results in fast, precise transition indications. The sixth sensor provides a reference light source, so that as the intensity of the light sources in the sensors degrade, the level necessary for a transition is lowered accordingly. Thus, a transition will not be missed because degradation has lowered the intensity of the light sources close to or below a fixed transition level.

Thus, the slide tray is always positioned in the same relationship to the hub, and the hub initially is always in the same relationship to the projector, so that when the tray is positioned on the hub, the zero position of the tray is coincident with the zero position of the tray sensing system.

In startup, when the power is turned on, a microswitch 321 (FIG. 9) on the plate on which the tray rests when it is in place senses whether or not a tray is in place. If a tray is in place, then the tray may be locked to the hub by activating button 283 in the hub. A switch in the hub 321 (FIG. 9) senses whether or not button 283 has been activated. Then the tray is moved to a reference position, and its proper position detected by fourth sensing means 311. Thus, the try is now referenced properly to the projector. The projector is now ready to begin operation. As the slide tray is rotated to address particular slide compartments, the fourth sensing means 311 provides continuous accurate information on the location of the slide tray, which permits accurate, random addressing of all compartments in the slide tray, both for removal and replacement of slides. The sensing of the position of the slide tray is continuous, and is independent of the particular means by which the tray is moved, including manual movement by the user.

FIGS. 21 and 22 show an alternative embodiment of the front end assembly. The left and right lens boxes 351 and 352, respectively, are secured to respective cover plates 354 and 355 which have an outline only somewhat larger than the outline of the lens boxes. Each of the cover plates 354 and 355 have a central opening through which the lens in the lens box extends. The lenses are held in their respective lens boxes by wheels positioned at the eight corners of the box. The lenses slide forward and aft of the projector by the wheels.

The right lens box 352 is riveted fixedly to its cover plate 355, while the left lens box 351 is attached to cover plate 354 by rivets which extend through vertical slots in the cover plate. The lens box 351 is thus held against horizontal movement relative to its cover plate but may move a short distance vertically.

The lower edge of each cover plate rides in a horizontal slot or track 357 near the bottom of the projector. This arrangement maintains the position of the bottom of the cover plates, permitting only lateral movement thereof. The two cover plates and the respective portions of the track 357 in which they slide are offset slightly, so that the two cover plates can overlap each other laterally, if desired.

Projecting slightly rearwardly from both upper corners of the left cover plate 354 are a pair of tab-like extensions or small blocks 359 and 360. Similarly, tab-like extension 361 extends rearwardly from the upper left hand corner of the right cover plate 355. The extension 362 from the upper right hand corner of cover plate 354 is typically somewhat larger in dimension than the other extensions, for reasons clarified hereinafter.

A guide rod 364 extends horizontally through each of the extensions 359-362. Guide rod 364 is supported by spherical bearings in each of the extensions, so that each cover plate 354 and 355 is free to move laterally toward and away from each other along guide rod 364, with the bottom edge of each cover plate sliding correspondingly in track 357.

The left lens box 351 includes a mechanism 366 for moving that lens box vertically. This is shown in FIG. 21 and more in detail in FIG. 22. The vertical movement mechanism 366 includes a block 368 Delrin or similar material which at its front end is wrapped around guide rod 364 so that plate 368 is free to move about guide 364. The block 368 extends rearwardly of lens box 351 for a substantial portion of its length.

Mounted to the top of lens box 351 is a U-shaped box 370, with the front and rear of the box 370 being open. A top plate 371 covers at least a portion of box 370 and is secured to the top side edges thereof. The block 368 extends rearwardly within box 370. In block 368, at approximately midlength, there is a horizontal slot 372 which extends the full width of the block. Positioned in slot 372 is a pin 374 which extends through the slot and is secured in some manner to the sides of box 370. At the center rear of the block 368 is a vertical opening which contains a threaded insert (not shown). A control screw 376 is mounted so that it extends through top plate 371 and through the block 368 so that the screw 376 bears against lens box 351 or a protective pad (not shown) secured to the top of the lens box. Positioned around control screw 376, between the top of the block 368 and top plate 371, is a bias spring 381. Rotation of control screw 376 will move the rear of the block 368 up or down, thus moving pin 374 up or down as well, which draws the entire lens box in the same direction, relative to its cover plate 354, which is fixed vertically.

Referring again to FIG. 21, the lens boxes 351 and 352 are moved laterally towards and away from each other by moving the cover plates 354 and 355 laterally through a master/slave drive mechanism. A drive rod 383 extends horizontally through the three extensions 359, 360 and 361 and terminates in a threaded engagement with block-like extension 362 at the upper right hand corner of cover plate 355. Rotation of drive rod 383 results in lateral movement of the right cover plates 354 and hence right lens box 352, either towards or away from the other lens box, depending upon the direction of rotation of the drive rod.

Secured to the right side of right lens box 352 is a master link 385 which extends substantially horizontally to the lower end of a pivot arm 387 which pivots about a center pivot point 388. Extending from the upper end of pivot arm 387 is a slave link 390 which extends substantially horizontally across the front of the cover plate 355 and is connected to the left lens box 351. Thus, a given movement of the right lens box 352, by rotating drive rod 383, will result in an opposite movement of the left lens box, i.e., the two lens boxes move simultaneously toward or away from each other.

Lens box stops (not shown) are provided at the top right corner of the projector, at the front thereof, in the vicinity of the upper edge of the right cover plate, and operate in conjunction with block-like extension 362 to limit the lateral movement of the cover plates in both directions.

FIG. 23 shows an alternative embodiment of certain portions of the slide handling control structure of FIGS. 8 and 9. The structure shown in FIG. 23 is used in conjunction with a somewhat different slide clamping mechanism than is described above. Briefly, the slide clamping mechanism includes a side clamp positioned along a first side of the slide gate and is pivoted about a vertical pin. This side clamp is biased with a spring against the gate at about a 45° angle to force the slide in the slide gate against the opposite or second side of the gate and rearwardly against the rear portion of the slide gate frame.

Extending across the bottom of the side gate, from the lower edge of the side clamp, is a thin clamp control rod which terminates at the second side of the slide gate in a short horizontal arm, spaced slightly outwardly away from the second side of the slide gate. At the very end of this arm is a wedge element. The slide clamping mechanism also includes a spring face clamp which is secured to the bottom of the slide gate and extends upwardly along the front edge of the slide gate adjacent the second side thereof. The spring face clamp includes a portion which curves inwardly toward the slide gate and the outwardly again, so that the curved portion bears firmly against a slide which is present in the slide gate, holding it firmly against the rear portion of the slide gate frame. The horizontal arm of the clamp control rod is arranged relative to the spring face clamp that a rearward movement of the horizontal arm forces the wedge element between the face clamp and the front edge of the gate frame.

Referring to FIG. 23, vertical mounting plate 400 is mounted to or near the base of the projector and extends upwardly in the vertical plane, similar to mounting plate 131 in the above-described embodiment. Mounted on horizontal rod 401, which extends through mounting plate 400, is cam disc 402, having drive pins extending out from the opposite surfaces thereof. Cam follower plate 406 and 408 are rotatably mounted on mounting plate 400 about point 407, on opposite sides of cam disc 402. Lifter 410 is also mounted for rotation about point 407, and is attached to cam follower plate 406.

The operation of the two cam follower plates is coordinated so that the tray is unlocked in proper sequence relative to the movement of the slide lifter, and vice versa. As explained above, the lifter is moved into its up position and then the tray is unlocked. Cam follower plate 406 controls the operation of the liter 410. Slots in the cam followers 406, mate with drive pins extending from one surface of cam disc 402. The cam follower 406 then rotates, carrying with it lifter 410.

Cam follower plate 408, which is nearest the mounting plate 400, behind cam follower plate 406 in FIG. 23, controls the action of the tray lock mechanism, which comprises a vertical arm 414 mounted for fore and aft movement in the vertical plane about point 416. At the top of vertical arm 414 is a tray latch element 418, which mates with the tray to lock it. A rearward movement of the vertical arm 414 and hence tray latch element 418 unlocks the tray so that it is free to move. A link arm 420 connects cam follower plate 408 to vertical arm 414 at approximately midheight. In operation, as cam disc 402 is rotated by control rod 404, cam follower plate 406 mates with a drive pin extending from one surface of the cam disc, resulting in the cam follower plate 408 rotating about point 407 and driving vertical arm 414 rearwardly through link arm 420.

The two cam followers 406 and 408 also control, through two plastiform elements 422 and 424, the operation of the slide clamping mechanism on the respective slide gates. The first plastiform element 422 consists of a base 425 which is secured to the vertical mounting plate 400 near the top rear thereof. Two vertical fingers 427, 428 extend downwardly from the rear of the base 425. At the bottom of the first, most rearward finger 427, is a paddle-like element 429 which is positioned so that a rearward movement of the first finger 427 results in paddle 429 moving the horizontal arm portion of the clamp control rod rearwardly. The wedge element on the end of the control rod is moved between the face clamp and the forward portion of the slide gate frame, moving the curved portion of the face clamp, which otherwise extends through an opening in the forward portion of the gate frame and against the slide, away from the slide. The paddle element 429 bears against the horizontal arm portion of the control rod, pushing the rod rearwardly, which results in the slide clamp pivoting open against its bias spring.

The second, forward vertical finger 428 of plastiform 422 has a pin 432 projecting horizontally therefrom, at about midlength. Pin 432 rides in a horizontal slot in mounting plate 400. The second finger 428 extends further downwardly at a slight forward angle from the location of the pin, terminating in a sharp edge. The other end of pin 432 is connected to the vertical arm 414, so that as vertical arm 414 moves rearwardly by the action of cam follower plate 408, which results in the tray being unlocked, the second finger of plastiform 422 moves rearwardly as well, by the rearward movement of pin 432. By virtue of the configuration of plastiform element 422 and the resilient nature of its plastic material, first finger 427 also moves rearwardly when the second finger 428 moves rearwardly. As explained above, when finger 427 moves rearwardly, the paddle element 429 of the first finger 427 moves sufficiently to the rear that the horizontal arm is moved rearwardly, forcing the wedge between the face clamp and the front portion of the gate frame and moving the horizontal rod to the rear. This opens both the side clamp and the face clamp, freeing the slide in the gate.

When the front finger of the first plastiform is moved rearwardly, the sharp lower edge of the finger is caught and held in a notch 439 in the end of second plastiform 424. The second plastiform element 424 includes a base portion 437 which is secured to the mounting plate 400 near the bottom front thereof. It includes a finger portion 440 which extends rearwardly and at a slight downward angle. At its rear end is the notch 439. The second plastiform 424 is arranged relative to the first plastiform 422 such that as the second finger of the first plastiform is moved to the rear, the lower edge catches in the notch 429 of the second plastiform, which results in the fingers of the first plastiform being held against forward movement, thus holding the gate clamps open.

However, when cam follower plate 406, which controls the slide lifter, rotates to lower the lifter, the edge of the cam follower 406 mates against projection 442 on the top edge of finger portion 440 of the second plastiform 424, forcing finger portion 440 downwardly sufficiently to release the lower edge of the second finger 428 from the notch 429 in the finger portion 440. This permits both the first and second fingers of the first plastiform 422 to move forwardly, with the paddle element 429 of the first finger moving away from the horizontal arm portion of the control rod in the gate structure. The spring in the side clamp then forces the side clamp back into position, and moves the rod horizontally, resulting in the wedge element moving out from between the face clamp and the gate frame, so that the face clamp returns to its clamping position as well. The gate is now ready to be moved into the project position.

Thus, a dual image, single tray slide projector has been described which includes a number of elements which make the projector reliable and practical in operation. Systems have been described which (1) enhance the image quality, especially permitting substantially undistorted overlapping and separation of the images; (2) provide a reliable slide handling capability, with minimal risk of jams, and (3) provide an accurate, fast control over the movement and addressing of the slide tray.

Although a preferred embodiment of the invention has been disclosed herein, it should be understood that various changes, modifications and substitutions may be incorporated in such embodiment without departing from the spirit of the invention, as defined by the claims which follow.

What is claimed is:

1. In a multiple image slide projector which includes a single slide tray for storing slides and first and second image projection systems which each include a slide gate movable between a first position in which slides are loaded and ejected, and a second position in which the slides are projected onto a screen, an apparatus for moving slides between the slide tray and the second position of the slide gates, comprising:
    means for locking and unlocking the slide tray;
    means for raising and lowering slides between the slide gate and the slide tray;
    means for moving the slide tray;
    means for controlling the operation of said locking/unlocking means and said raising/lowering means in a fixed sequence;
    means for sensing the operational status of said locking/unlocking means and said raising/lowering means; and
    means independent of said controlling means and said tray moving means for moving each of the slide gates, independently of each other, when said raising/lowering means is in its lowermost position.

2. The apparatus of claim 1, wherein said means for controlling the operation of said locking/unlocking means and said raising/lowering means is actuated by an electrical signal.

3. The apparatus of claim 1, including means for holding slides in said slide gates and means for maintaining said holding means open, permitting slides to move into said slide gates.

4. The apparatus of claim 1, wherein said raising/lowering means is substantially always in its uppermost position during the time that the slide tray is moving.

5. The apparatus of claim 3, wherein said first maintaining means and said locking/unlocking means are linked together so that they operate simultaneously.

6. The apparatus of claim 1, wherein said raising/lowering means and said locking/unlocking means are linked together so that they are actuated in a fixed time sequence.

7. The apparatus of claim 3, including a double geneva control means comprising two sections, one geneva section controlling said raising/lowering means, the other geneva section controlling said locking/unlocking means, said double geneva also controlling said maintaining means, at least a portion of the double geneva being positioned on a mounting rod, the apparatus including means for rotating said mounting rod.

8. The apparatus of claim 1, including means for sensing the movement of a slide from said slide tray into said slide gate, so that it is known whether or not the slide moving out of said slide tray is positioned properly in said slide gate.

9. The apparatus of claim 1, wherein said means for moving said slide gates includes a flat plate located beneath the load position of said slide gates, said flat plate having a pin extending upwardly from the upper surface thereof, said means for moving said slide gates further including means for rotating said plate, wherein each slide gate has connected thereto, near the bottom thereof, a fork having an opening at one end thereof which is engaged by said upstanding pin as said plate is initially rotated in one direction or the other, further rotation of the plate resulting in the movement of the slide gate associated with the engaged fork between the project and load positions thereof.

10. The apparatus of claim 1, including blackout means which move into and out of the respective projection lens systems, preventing light from reaching the screen, the movement of said blackout means being relatively rapid when the blackout means is moving into position in its associated projection lens system, and relatively slowly when the blackout means is moving out of its associated projection lens system.

11. The apparatus of claim 10, wherein said blackout means includes a thin flap, sufficiently large to block any light from reaching the screen when it is in position in a projection lens system, a pivot means located forwardly of said flap, a first elongated lever connecting said flap to said pivot means, a double heart-shaped cam for controlling the movement of said blackout means, said cam having two sections, one section for each blackout means, each section having two cam tracks, one cam track controlling the movement of the flap as it moves into position, the other cam track controlling the movement of said flap as it moves out of position, means for controlling the movement of said cam such that it operates in proper sequence relative to the movement of said gate means, a second lever connected between said pivot means and one section of said cam, and means biasing said second lever against said cam, so that said second lever, and hence said first lever and said flap, move in accordance with the configuration of said cam tracks.

12. The apparatus of claim 7, including means for determining the angular position of said mounting rod, to determine the angular position of said double geneva control means, and hence, the operational status of said raising/lowering means and said locking/unlocking means.

13. The apparatus of claim 12, wherein said determining means includes a plate secured to said rod, extending about the circumference of said rod and having a cutout portion therein and two detection means about the edge of the plate, each comprising a light source and a light detector means, the two detection means being so spaced, and the cutout portion having such a dimension, and being so positioned, that the changes of operating state of said locking/unlocking means and said raising/lowering means, can be ascertained.

* * * * *